United States Patent [19]
Munemori et al.

[11] Patent Number: 6,081,687
[45] Date of Patent: Jun. 27, 2000

[54] COPYING MACHINE PROVIDED WITH AN IMAGE READING APPARATUS FOR SCANNING MOVING DOCUMENTS

[75] Inventors: Seiichi Munemori, Toyokawa; Hirokazu Matsuo, Toyohashi, both of Japan

[73] Assignee: Minolta Co., Ltd., Osaka, Japan

[21] Appl. No.: 08/857,566

[22] Filed: May 16, 1997

[30] Foreign Application Priority Data

May 16, 1996 [JP] Japan ................................. 8-121805
Jun. 12, 1996 [JP] Japan ................................. 8-151270

[51] Int. Cl.[7] .................................................. G03G 15/00
[52] U.S. Cl. .......................... 399/374; 399/370; 358/300; 358/444
[58] Field of Search .................................... 399/370, 373, 399/374; 358/496, 498, 444, 449, 300; 355/24, 25

[56] References Cited

U.S. PATENT DOCUMENTS

| | | |
|---|---|---|
| 4,307,958 | 12/1981 | McIrvine . |
| 4,456,236 | 6/1984 | Buddendeck . |
| 4,456,237 | 6/1984 | Buddendeck . |
| 4,674,866 | 6/1987 | Tanaka ........................ 355/23 |
| 5,016,061 | 5/1991 | Tashiro et al. ............... 399/374 |
| 5,068,747 | 11/1991 | Nonoyama ................... 358/448 |
| 5,157,521 | 10/1992 | Chung . |
| 5,206,684 | 4/1993 | Wada et al. .................. 399/1 |
| 5,241,397 | 8/1993 | Yamada ....................... 358/296 |
| 5,257,064 | 10/1993 | Okamoto ..................... 355/24 |
| 5,438,435 | 8/1995 | Lawniczak ................... 358/496 |
| 5,440,403 | 8/1995 | Hashimoto et al. .......... 358/444 |
| 5,596,399 | 1/1997 | Dempsey et al. ............. 399/45 |
| 5,597,153 | 1/1997 | Maruyama et al. ........... 271/4.1 |
| 5,669,056 | 9/1997 | Rubscha ....................... 399/367 |

FOREIGN PATENT DOCUMENTS

| | | |
|---|---|---|
| 62-039254 | 2/1987 | Japan . |
| 62-102663 | 5/1987 | Japan . |
| 2-048858 | 2/1990 | Japan . |
| 6-152888 | 5/1994 | Japan . |
| 8-032727 | 2/1996 | Japan . |

*Primary Examiner*—Robert Beatty
*Attorney, Agent, or Firm*—Burns, Doane, Swecker & Mathis, LLP

[57] ABSTRACT

An inverting document feeder feeds a document from the document tray to the position where the image reader reads the document, turns the document over, and then reads the second side. Document size determination sensors detects the document passing through, and determines the size of the document from detections signals of the width of the document and the time elapsed between the detection of the top end of the document and the detection of the bottom end of the document. When the top end of the document reaches the document reading position, image reading is started by a scanner, regardless of whether the document size has been determined or not. The image data thus obtained are written into and read out of a memory unit in a specified order. Even if the document reading has not been finished at the time of determining the document size, feeding of a copying sheet of a size corresponding to the document size is started, and the image data stored in the memory unit are read out to form an image on the copying sheet.

22 Claims, 28 Drawing Sheets

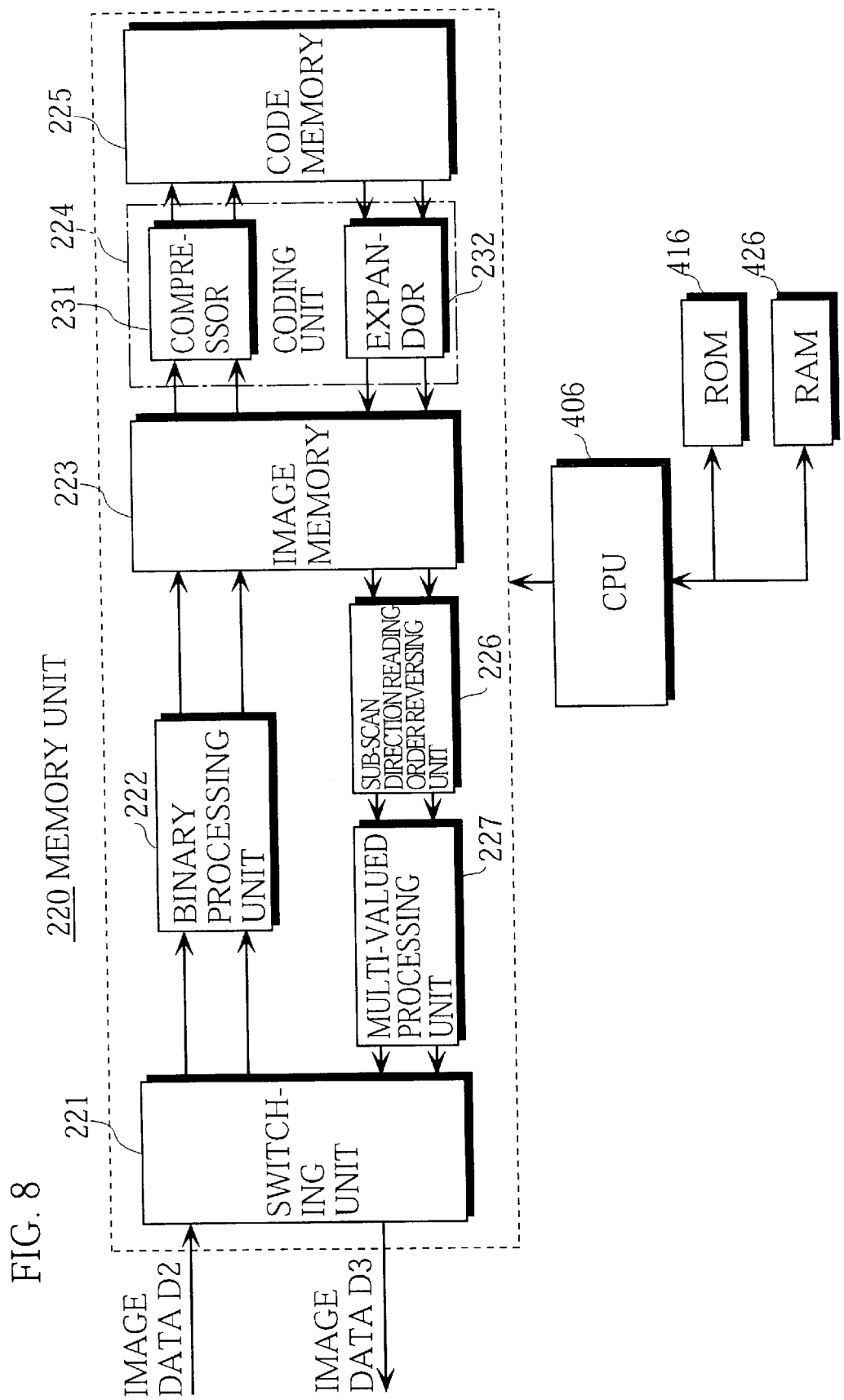

COPY DISCHARGING DIRECTION

FIG. 22A

A) ONE-SIDED DOCUMENT MODE

| WRITING ORDER | COMPRESSED DATA ON CODE MEMORY | READING ORDER IN ONE-SIDED COPYING | READING ORDER IN TWO-SIDED COPYING | |
|---|---|---|---|---|
| | | | A3T | A4Y |
| 1 | 1F | 1 | 1 | 1 |
| 2 | 2F | 2 | 3 | 3 |
| 3 | 3F | 3 | 5 | 5 |
| 4 | 4F | 4 | 2 | 7 |
| 5 | 5F | 5 | 4 | 2 |
| 6 | 6F | 6 | 6 | 4 |
| 7 | 7F | 7 | 7 | 6 |
| 8 | 8F | 8 | 8 | 8 |

FIG. 22B

B) TWO-SIDED DOCUMENT MODE

| DOCUMENT | WRITING ORDER | COMPRESSED DATA ON CODE MEMORY | READING ORDER IN ONE-SIDED COPYING | READING ORDER IN TWO-SIDED COPYING |
|---|---|---|---|---|
| A3T | 1 | 1F | 1 | 1 |
| | 2 | 1R | 2 | 3 |
| | 3 | 2F | 3 | 5 |
| | 4 | 2R | 4 | 2 |
| | 5 | 3F | 5 | 4 |
| | 6 | 3R | 6 | 6 |
| | 7 | 4F | 7 | 7 |
| | 8 | 4R | 8 | 8 |
| A4Y | 1 | 1F | 1 | 1 |
| | 2 | 2F | 3 | 2 |
| | 3 | 1R | 2 | 5 |
| | 4 | 2R | 4 | 6 |
| | 5 | 3F | 5 | 3 |
| | 6 | 4F | 7 | 4 |
| | 7 | 3R | 6 | 7 |
| | 8 | 4R | 8 | 8 |

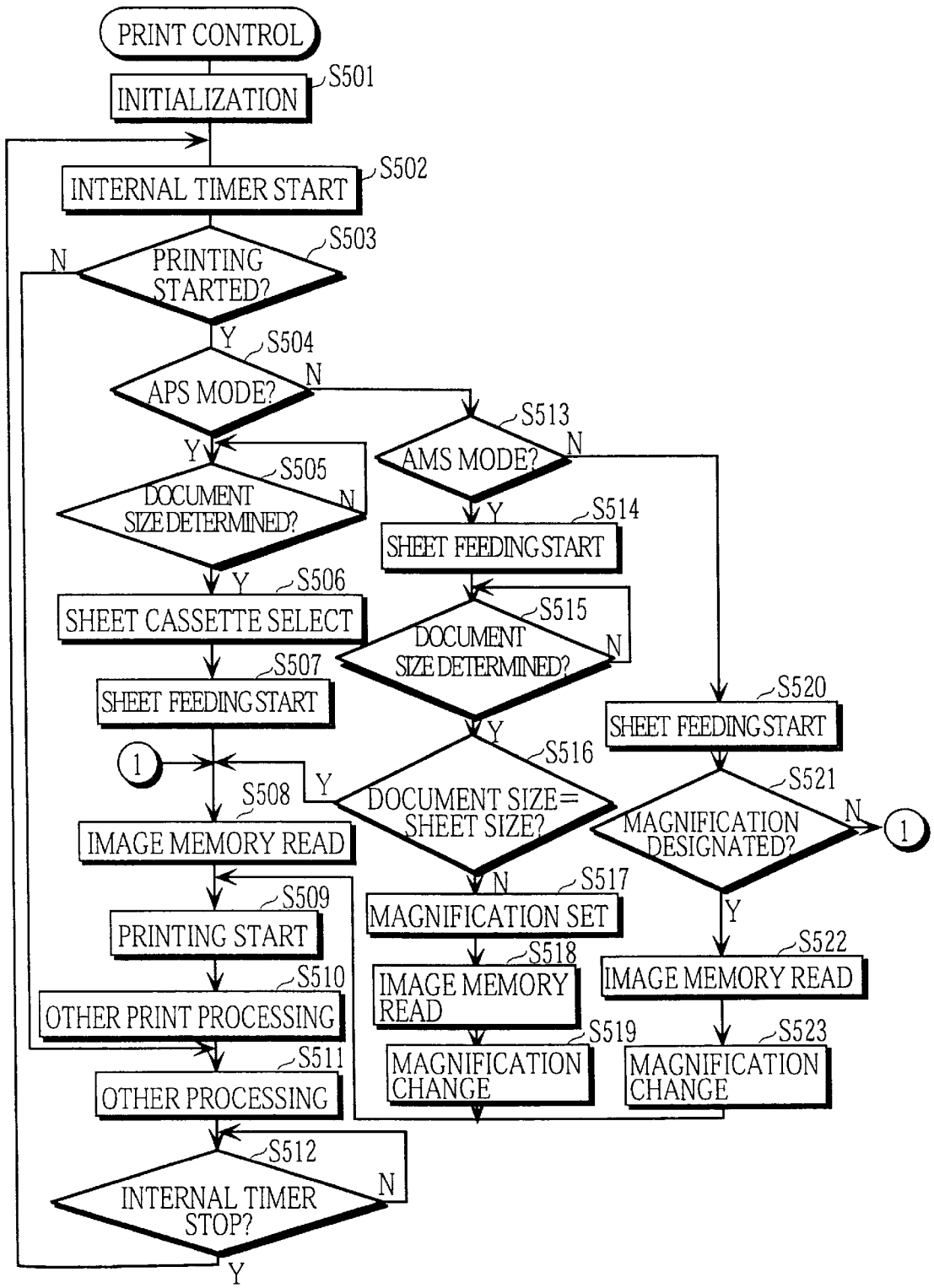

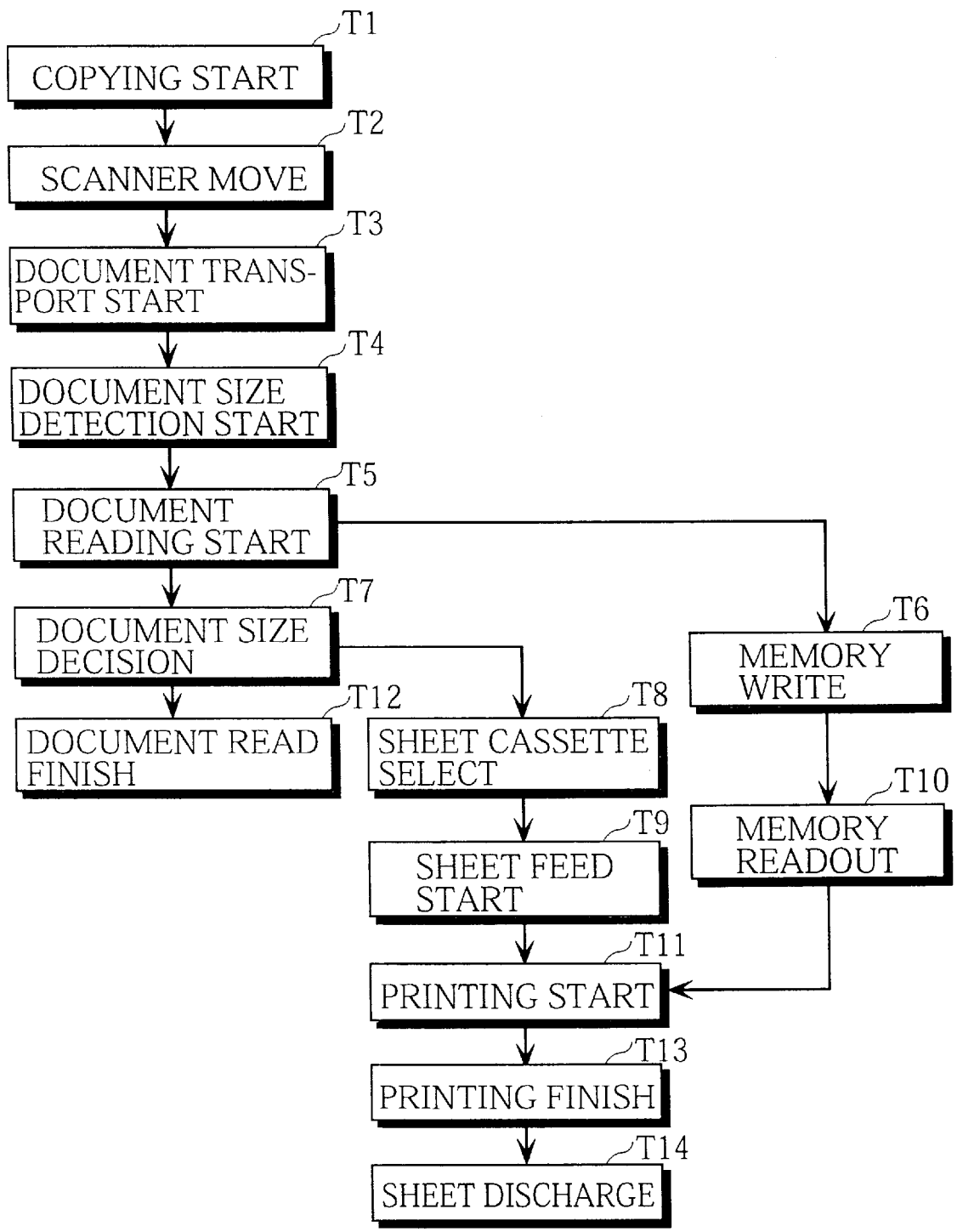

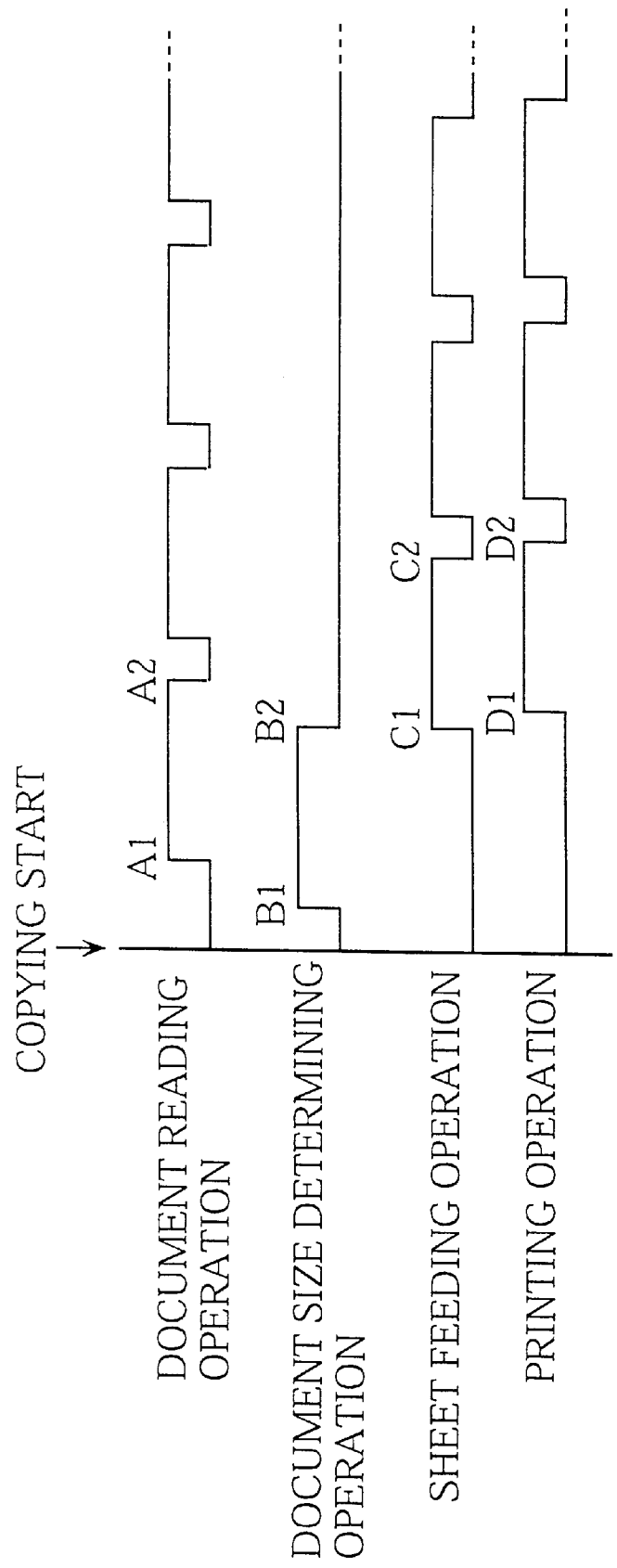

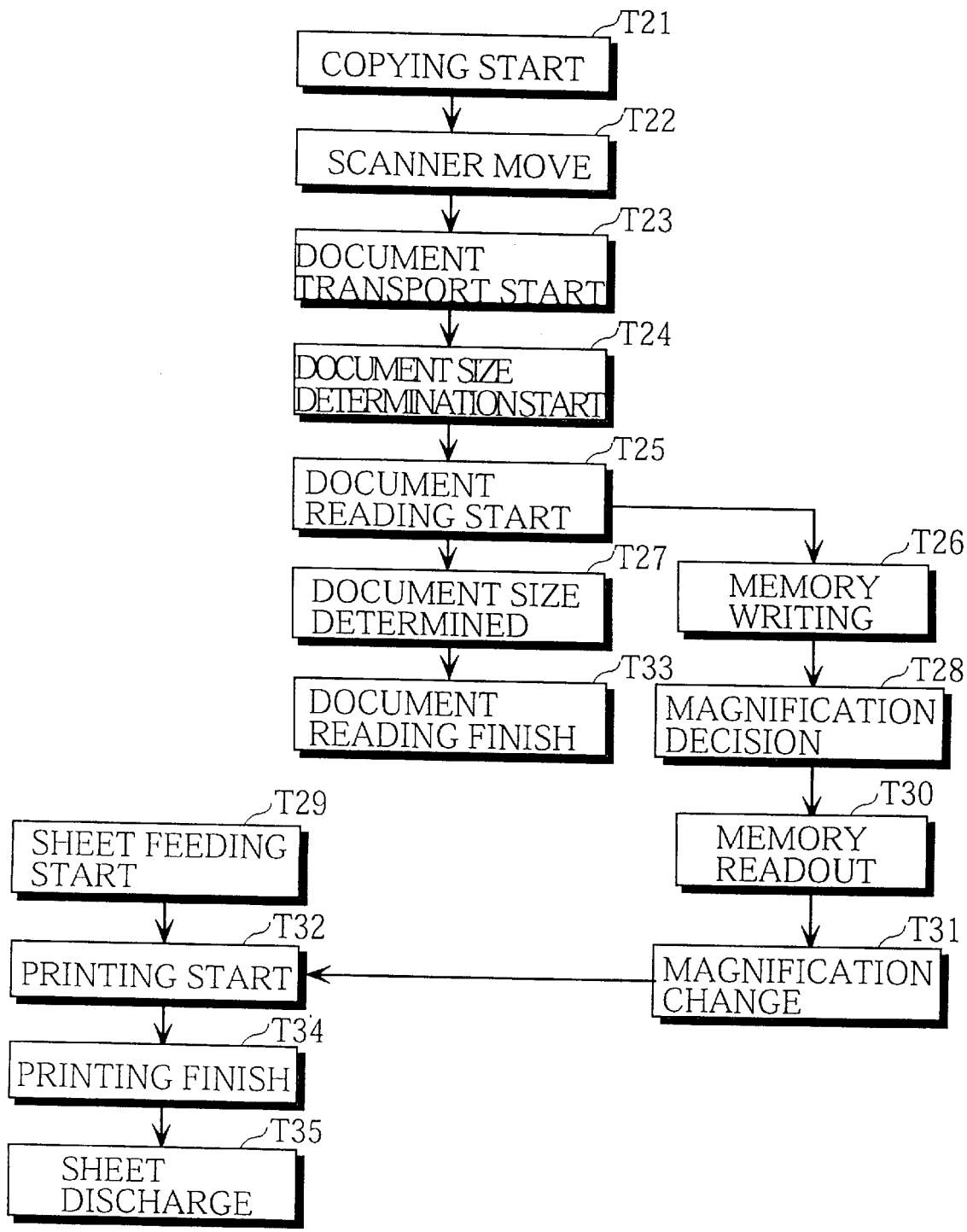

COPYING MACHINE PROVIDED WITH AN IMAGE READING APPARATUS FOR SCANNING MOVING DOCUMENTS

BACKGROUND OF THE INVENTION (1) Field of the Invention

The present invention relates to a copying machine provided with an image reading apparatus for scanning moving original documents.

(2) Related Art

A conventional copying machine of a stationary document scanning type which reads original documents placed on the platen glass by moving the scanner in an automatic paper selection mode (hereinafter simply referred to as "the APS mode") forms images on copying sheets as follows. Firstly, the size of an original document transported to a predetermined position on the platen glass is determined by photoelectric sensors provided below the platen glass. The sheet size is selected according to the determined document size, and copying sheets of the determined sheet size are fed into an image forming unit. The scanner moves in a parallel direction with the platen glass to read the image data from the original document, and an image is finally formed on the copying sheet in accordance with the image data.

In the APS mode, a copying sheet of a suitable size is selected automatically as described above, and thus, image formation on copying sheets of a wrong size can be effectively prevented. For this reason, many types of copying machine today employ the APS mode as a standard mode. Especially in a copying machine of a stationary document scanning type, the feeding of copying sheets of a suitable size can be started almost at the same time that the document reading is started, because the size of copying sheets to be fed is determined prior to the start of the document reading. Thus, the time required for the copying operation, starting from image reading and ending in image formation, can be shortened.

With such a copying machine, however, the scanner needs to be returned to the home position every time it reads an original document, which will result in low processing speed when making a plurality of copies. Accordingly, the overall copying operation will be adversely affected and become slow.

For a solution, an increasing number of copying machines provided with an image reader unit of a moving document scanning type have been used in recent years. In a copying machine of this type, the scanner is fixed to the document reading position, and image data are read by moving original documents in the sub-scan direction at the same speed as the scan speed of the copying machine of a stationary document scanning type. Here, the original documents are fed and transported by an automatic document feeder.

This scanning method has the advantage that the document reading is performed at very high speed, because a plurality of original documents are transported to the reading position one by one and discharged onto a discharge tray without stopping for image reading.

When setting the APS mode in a copying machine of this moving document scanning type, however, the image data of one page original document are first read and written into the memory, and the document size is then determined based on the image data written in the memory. After that, the copying sheet size is determined and the sheet feeding is started. As a result, image formation cannot be performed in parallel with image reading, and the whole meaning of employing the moving document scanning method, which is aimed at improving the reading speed, will be spoiled.

To avoid such an undesirable situation, the document feed tray may be provided with photoelectric sensors for detecting original documents to determine the document size by detecting the document both in longitudinal and transverse directions. When making copies from original documents of various sizes, however, there is a problem that only the largest size document can be detected by the sensors.

For an alternative solution, the document size may be determined while an original document is transported from the document feed tray to the document reading position by the automatic document feeder. Here, the original document passing through is detected by photoelectric sensors or the like, and the document length in the transport direction is determined from the elapsed time and the transport speed. Based on the combination of the document length and a detection signal in the transverse direction, the document size can be determined prior to the start of image reading.

According to the above document size determination method, image formation can be performed in parallel with image reading, because the document size is determined prior to the start of the image reading, as in the stationary document scanning method.

To detect an original document passing through, however, the top end and the bottom end of the original document being transported should be precisely sensed by a photoelectric sensor and the like. Therefore, the photoelectric sensor should be disposed past the separating position, where original documents are separated from one another by separating rollers.

In order to determine the document size prior to the start of image reading, the length from the separating rollers to the document reading position should be longer than the transport-direction length of an original document of the largest readable size. If the largest readable size of document is A3 in the longitudinal direction (hereinafter referred to as A3T, T indicating "longitudinal"), the length of the transport path should be at least 420 mm.

As a result, the automatic document feeder will become large, taking up too much space. The automatic document feeder of this type has a further disadvantage of being heavy, which makes it very difficult for users to lift it up and place an original document directly on the platen glass.

This kind of problem cannot be avoided yet in a copying machine of a moving document scanning type which employs an automatic magnification selection mode (hereinafter simply referred to as "AMS mode"), as long as the document size has to be determined as a preparation for image formation. The AMS mode is set to determine such magnification that the image of an original document can be printed on a copying sheet of a predetermined size, and to subject the image data to magnification change to form the image at the determined magnification.

SUMMARY OF THE INVENTION

The first object of the present invention is to provide a copying machine of a moving document scanning type having a small automatic document feeder which is capable of forming images at high speed either in the APS mode or in the AMS mode.

The second object of the present invention is to provide an image reader which is capable of reading documents at high speed in two-sided document reading mode.

The first object can be achieved by producing a copying machine for forming an image on a copying sheet according to the image data of a moving document read by an image reader provided in a document reading position, and the copying machine comprises: a document feeder for feeding documents placed on a document tray to the document reading position one by one; a document detecting unit provided in a transport path in the document feeder for detecting a document passing through the transport path; a document size determining unit for determining the size of a transported document in accordance with detection signals transmitted from the document detecting unit; a sheet feeder for feeding a copying sheet of a size selected in accordance with the determined document size; a memory for storing image data of a document read by the image reader; a printer for forming an image on a copying sheet fed from the sheet feeder in accordance with the image data; and a controller for controlling the operations of the image reader, the sheet feeder, and the printer, so that the image reading is started when the top end of a document reaches the document reading position even if the document size determining unit has not yet determined the size of the document, the image data of the document are written into the memory, the feeding of a copying sheet of a selected size is started even if the image reading has not been finished at the time of determining the document size, the reading of the image data from the memory is started, and an image is finally formed on the selected size copying sheet. The first object of the present invention can also be achieved by producing a copying machine for forming an image on a copying sheet according to the image data of a moving document read by an image reader provided in a document reading position, and the copying machine comprises: a document feeder for feeding documents placed on a document tray to the document reading position one by one; a document detecting unit provided in a transport path in the document feeder for detecting a document passing through the transport path; a document size determining unit for determining the size of a transported document in accordance with detection signals transmitted from the document detecting unit; a sheet feeder for feeding a copying sheet of a predetermined size; a memory for storing image data of a document read by the image reader; a magnification determining unit for determining magnification from the determined document size for forming an image of the document on the copying sheet of the predetermined size; a magnification change unit for subjecting the image data to magnification change so as to form an image at the determined magnification; a printer for forming an image on a copying sheet fed from the sheet feeder in accordance with the magnification-changed image data; and a controller for controlling the operations of the image reader, the sheet feeder, and the printer, so that image reading is started when the top end of a document reaches the document reading position even if the document size determining unit has not yet determined the size of the document, the image data of the document are written into the memory, the reading of the image data from the memory is started even if the image reading has not been finished at the time of determining magnification from the determined document size, and the image data are subjected to magnification change so as to form an image on a copying sheet at the determined magnification.

With this structure, image reading is started prior to the determination of the document size, and image formation is performed by reading stored image data in the APS mode or the AMS mode at the time of the determination of the document size even if the image reading has not been finished yet. Thus, the processing time required between image reading and image formation can be shortened, and the overall image forming operation can be performed at high efficiency.

The second object of the present invention can be achieved by producing an image reading apparatus for reading a document passing through a document reading position, and the image reading apparatus comprises: a first transport unit for transporting documents one by one in a first transport direction from a document tray to the document reading position; a second transport unit for turning over a document by guiding the document into a U-shaped transport path to send it back to the document reading position in a second transport direction, which is opposite to the first transport direction; an image reader disposed in the document reading position for optically reading a document passing through and producing image data; a memory for storing image data; and a controller for controlling the writing order or reading order of image data.

With this structure, the conventional need to pull a document temporarily into a switchback transport path to turn it over can be eliminated, so that documents can be fed to the document reading position successively for two-sided document reading. Thus, two-sided document reading can be performed at very high speed.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 8 is a block diagram of the memory unit of the control unit.

FIGS. 22A and 22B are tables of the memory reading order for all image forming modes.

FIG. 25 is a flowchart showing the subroutine of the print control in the flowchart of FIG. 12.

FIG. 26 shows the process of starting copying, printing, and discharging copy sheets in APS mode when performing moving document scanning.

FIG. 27 is a timing chart of the process of document reading, document size determination, sheet feeding, and printing, in accordance with the processing order of FIG. 26.

FIG. 28 shows the process of starting copying, printing, and discharging copy sheets in the AMS mode when performing the moving document scanning.

DESCRIPTION OF THE PREFERRED EMBODIMENTS

The following is a description of embodiments of the image reading apparatus of the present invention applied to a digital copying machine.

(1) Overall Structure of the Digital Copying Machine

Figure 1:
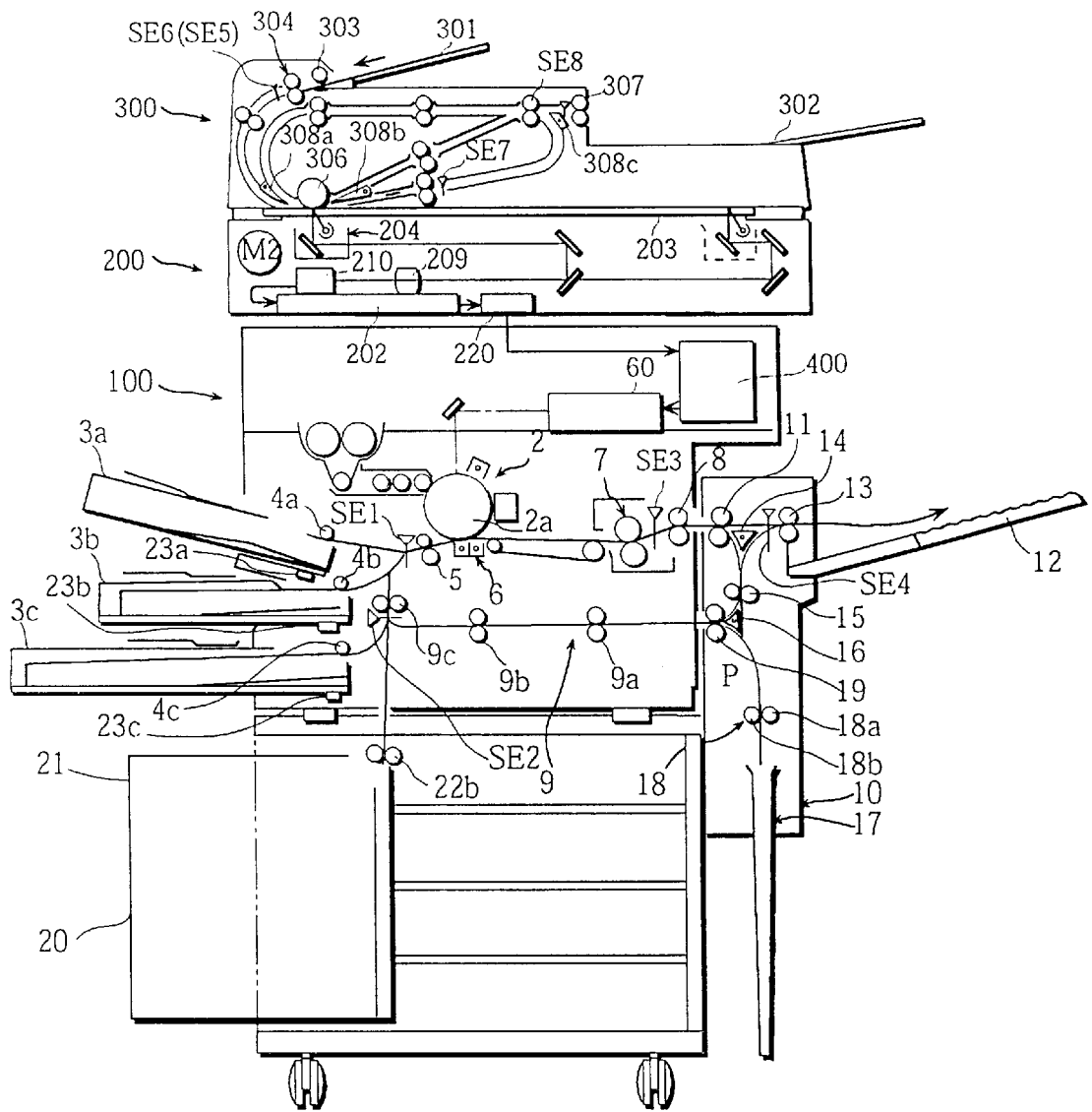
FIG. 1 shows the overall structure of a copying machine provided with an image reader unit of the present invention.

FIG. 1 shows the overall structure of the digital copying machine to which the image reading apparatus of the present invention is applied (hereinafter, this copying machine will be simply referred to as "the copying machine"). As shown in the figure, the copying machine mainly comprises a printer unit 100, an image reader unit 200, and an automatic document feeder 300.

(1-1) Printer Unit 100

The printer unit 100 is provided with a conventional electrophotographic image forming unit 2 in its mid section. The image forming unit 2 comprises a photosensitive drum 2a, a sensitizing charger, an exposure optical system, a developing unit, a transferring charger, and a drum cleaner. Reference numerals 3a, 3b, and 3c indicate sheet cassettes provided at one side of the printer unit 100. Copying sheets are fed from a selected sheet cassette to a transferring position 6 between the photosensitive drum 2a and the transferring charger, via corresponding rollers 4a, 4b, or 4c, and register rollers 5.

A toner image transferred onto a copying sheet by the transferring position 6 is fixed by a fixing unit 7, and the copying sheet is then sent to a duplex unit 10 by first discharging rollers 8.

The duplex unit 10 is provided with a first switching claw 14 between second discharging rollers 13 and receiving rollers 11 for receiving a copying sheet discharged from the first discharging rollers 8. The first switching claw 14 is designed to send a copying sheet either to a discharged sheet receiving tray 12 or to first reversible transport rollers 15.

When performing two-sided copying on copying sheets (i.e., in a two-sided copy mode), a copying sheet is sent to the first reversible transport rollers 15 which rotate forward to feed a copying sheet on which front-side copying has already been performed toward a switchback path 17. When the bottom end of the copying sheet reaches point P in the figure, second reversible transport rollers 18 rotate backward to reverse the moving direction of the copying sheet, and the copying sheet is then fed into a sheet re-feeding path 9 by means of a second switching claw 16.

The copying sheet fed into the sheet re-feeding path 9 reaches the register rollers 5 via transport rollers 9a, 9b, and 9c. After the transport timing has been adjusted by the register rollers 5, the copying sheet is sent to the transferring position 6, where a second image formed by the image forming unit 2 is transferred onto the reverse side of the copying sheet. The transferred image is then fixed by the fixing unit 7, and discharged onto the discharged sheet receiving tray 12, with the reverse side facing upward, via the first discharging rollers 8, the receiving rollers 11, the first switching claw 14, and the second discharging rollers 13.

When performing one-sided copying on copying sheets (i.e., in a one-sided copy mode), right after the bottom end of a copying sheet with an image copied on its front side has passed the first switching claw 14, the first reversible transport rollers 15 rotate backward to send the copying sheet to the second discharging rollers 13. By doing so, the copying sheet with an image formed on its front side is discharged upside down onto the discharged sheet receiving tray 12.

Reference numeral 20 indicates an optional sheet feeding unit, 21 indicates its feeding rollers, and 22a and 22b indicate its transport rollers. Reference numerals 23a, 23b, and 23c indicate conventional sheet size detectors formed by a plurality of microswitches which determine the size and direction (longitudinal or transverse) of a sheet (see Japanese Laid-open Patent Application No. 63-70865, for instance).

In the above description, one copying procedure is performed for one copying sheet. When performing two-sided copying on a plurality of copying sheets at once, the copying sheets are fed successively into a transport path (hereinafter referred to as the circular sheet transport path) which starts from the register rollers 5, extends through the transferring position 6, the fixing unit 7, the duplex unit 10, and the sheet re-feeding path 9, and ends back in the register rollers 5. Image formation is first performed on the front side of each of the copying sheets, and successively on the reverse side of each of the copying sheets. Thus, the throughput in two-sided copying can be improved, and the larger the number of copying sheets contained in the circular sheet transport path is, the higher the throughput is.

The maximum number of copying sheets containable in the circular sheet transport path is determined from the length of the circular sheet transport path, the sheet size, and the sheet feed intervals. The sheet feed intervals vary depending on the image information volume per page and the throughput of the CPU 406 of a memory unit 220 (mentioned later). The sheet feed intervals also vary depending on whether copying sheets are introduced into the switchback path 17. If copying sheets are introduced into the switchback path 17 in the two-sided copy mode, the sheet feed intervals become longer by the length of the switchback path 17.

The transport rollers 18 in the switchback path 17 consist of a drive roller 18a on the right and a coupled drive roller 18b on the left. The drive roller 18a rotates backward to send a copying sheet from the switchback path 17 to re-feeding rollers 19, which ensures that the copying sheet is transported into the sheet re-feeding path 9.

The transporting power of the transport rollers 18 is made smaller than the transporting power of the re-feeding rollers 19, so that the re-feeding rollers 19 can pull a copying sheet into the sheet re-feeding path 9 even when the transport roller 18a resumes rotating forward, and that the next copying sheet can be introduced smoothly into the switchback path 17. This eliminates the need to change sheet intervals just to go through the switchback path 17 in the two-sided copy mode.

Accordingly, image formation in the two-sided copy mode is performed on a plurality of copying sheets in the following manner. Firstly, copying sheets of a size selected according to the image information obtained by reading an original document are fed one by one for the front-side image formation at suitable sheet intervals for the amount of image information and the throughput of the CPU 406 of the memory unit 220.

The copying sheets with an image formed on the front side pass through the switchback path 17, and are sent to the sheet re-feeding path 9 for the reverse-side image formation. They are kept within the transport path, and the sheet feeding from the sheet cassette 3a, 3b, or 3c, is continued until the first copying sheet reaches a certain position before the image forming unit 2, i.e., right before the first copying sheet overlaps with the next copying sheet being fed, the sheet feeding is suspended until the next front-side copying is commenced.

Accordingly, the maximum number of sheets can be held in the circular sheet transport path for image formation, and overlaps between a copying sheet being re-fed and a copying sheet being newly fed can be avoided without fail. Thus, two-sided image formation on a large number of sheets can be performed at high efficiency.

The timing of suspending the sheet feeding varies depending on the sheet size, sheet intervals, and the distance between each sheet cassette 3a, 3b, or 3c, or the outlet of an optional feeding unit 20 and the transferring position 6. The timing of feeding and re-feeding operations is controlled by a CPU 404 in a control unit 400, which will be described later.

(1-2) Image Reader Unit 200

Figure 2:
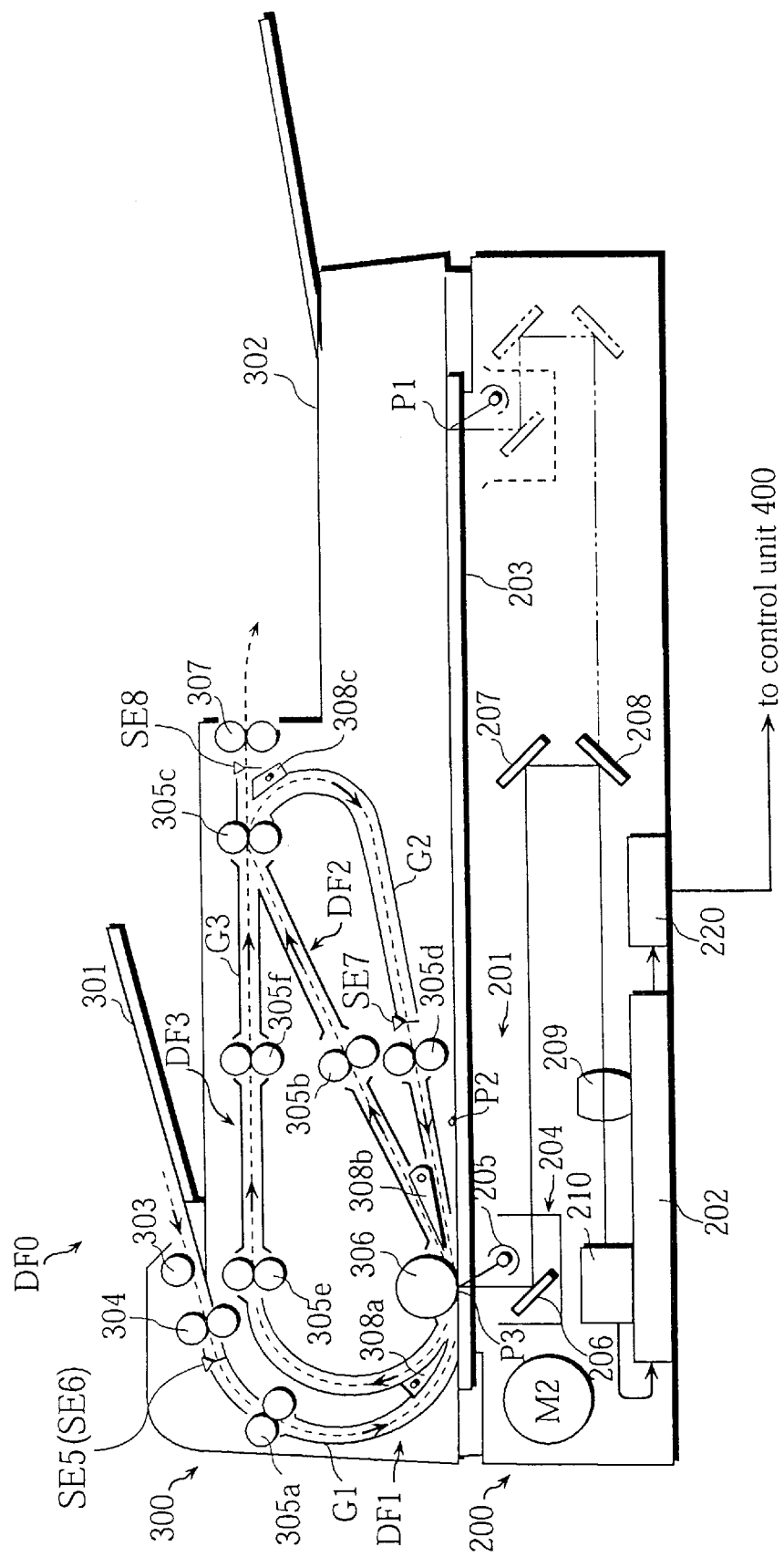
FIG. 2 is an enlarged view showing the structure of the automatic document feeder and the image reader unit of the copying machine of FIG. 1.

FIG. 2 shows a schematic view of the image reader unit 200 and the automatic document feeder 300. As shown in the figure, the image reader unit 200 consists of a scanning system 201 and an image signal processing unit 202. The scanning system 201 comprises an exposure lamp 205 and a first mirror 206 attached to a scanner 204 moving below a platen glass 203, second and third mirrors 207 and 208 moving in the same direction as the scanner 204 at half the moving speed of the scanner 204, a converging lens 209, a CCD image sensor 210 (hereinafter simply referred to as "CCD sensor 210"), and a scanner motor M2 for moving the scanner 204 as well as the second and third mirrors 207 and 208.

The automatic document feeder 300 is mounted on the upper surface of the image reader unit 200, with the deep side being the fixed axis, so that the automatic document feeder 300 can be lifted upward. In a conventional document copying operation, the automatic document feeder 300 is lifted upward to place an original document on the platen glass 203, and then pulled back down so as to press the original document onto the platen glass 203. The scanner 204 moves from a read starting position P1 to a read ending position P2 so as to scan the image of the original document (hereinafter, this type of scanning will be referred to as "stationary document scan mode").

The reflection light from the original document to which the exposure lamp 205 emits light is reflected by the first mirror 206 in a parallel direction with the platen glass 203, the reflected light is led into the conversing lens 209 by the second and third mirrors 207 and 208, and an image is then formed on the sensor surface of the CCD sensor 210. Since the second and third mirrors 207 and 208 moves in the same direction as the scanner 204 at half the moving speed of the scanner 204 as described above, the light path length from the reflection surface of the original document to the converging lens 209 is fixed, and image formation by the converging lens 209 is always conducted on the sensor surface of the CCD sensor 210.

The CCD sensor 210 converts the reflection light into electric signals and outputs them to the image signal processing unit 202. The image signal processing unit 202 in turn converts the electric signals into multi-valued digital signals, processes them so as to improve image quality, and then stores them into the memory unit 220.

The image data stored in the memory unit 220 are read out when necessary, and in accordance with the image data, image formation is performed by the printer unit 100.

When scanning an original document moving through the automatic document feeder 300 (hereinafter, this type of scanning will be referred to as "moving document scan mode"), the scanner 204 is fixed to a document reading position P3 at the left side edge of the platen glass 203, and reads the image of an original document sent to the document reading position P3 by the automatic document feeder 300.

(1-3) Automatic Document Feeder 300

As shown in FIG. 2, the automatic document feeder 300 feeds an original document (not shown in the figure) placed on a document feed tray 301 into the circular sheet transport path shown by the broken line in the figure. After passing the document reading position P3 on the platen glass 203, the original document is discharged onto a discharged document receiving unit 302 in the moving document scan mode.

The automatic document feeder 300 comprises: a document feeding unit DF0 for feeding original documents placed on the document feed tray 301 one by one via a feeding roller 303 and separating rollers 304; a first transport unit DF1 for transporting an original document to the document reading position P3 via transport rollers 305a; a second transport unit DF2 for transporting the original document, which has passed the document reading position P3, through transport rollers 305b, 305c, and 305d, and returning it to the document reading position P3, with the reverse side of the original document facing downward; a third transport unit DF3 for guiding the original document, which has passed the document reading position P3, to discharging rollers 307 via transport rollers 305e and 305f; a document reading position roller 306 for transporting and pressing the original document on the read surface in the document reading position P3; and switching claws 308a to 308c for switching the transport paths at the point where the transport paths cross each other.

In FIG. 2, transport guides, which constitute the circular sheet transport path including the transport units DF1 to DF3, are denoted by signs G1 to G3. Each transport guide comprises a pair of guide plates facing each other, so that original documents can be transported smoothly between them.

The transport path length of the second transport unit DF2 is longer than the longitudinal length of the largest readable size original document (in the embodiments of the present invention, it is A3 size in Japanese Industrial Standard) by a predetermined length. On the other hand, there are no limitations for the transport path length of the first transport unit DF1, which is preferably short, so that the automatic document feeder 300 can be made as compact as possible.

All the rollers are driven by a motor (not shown in the figure) and the switching claws are activated by a solenoid (not shown) to change the direction of the claws.

The following is an explanation of the transport operation when feeding a plurality of original documents using the automatic document feeder 300 constructed as above, with reference to FIGS. 3A to 3C and FIGS. 4A to 4E.

In these figures, the transport guides G1 to G3 of FIG. 2 are not shown to avoid complication, while the circular sheet transport paths are shown by solid lines, and the actual document positions are shown by bold solid lines.

To illustrate the operation of turning each document over in the feeding order, each document number and its side are shown in a half-round projection on each document surface ("F" indicates a front side, while "R" indicates a reverse side). For instance, "3R" stands for the reverse side of the third document.

Figure 3A:
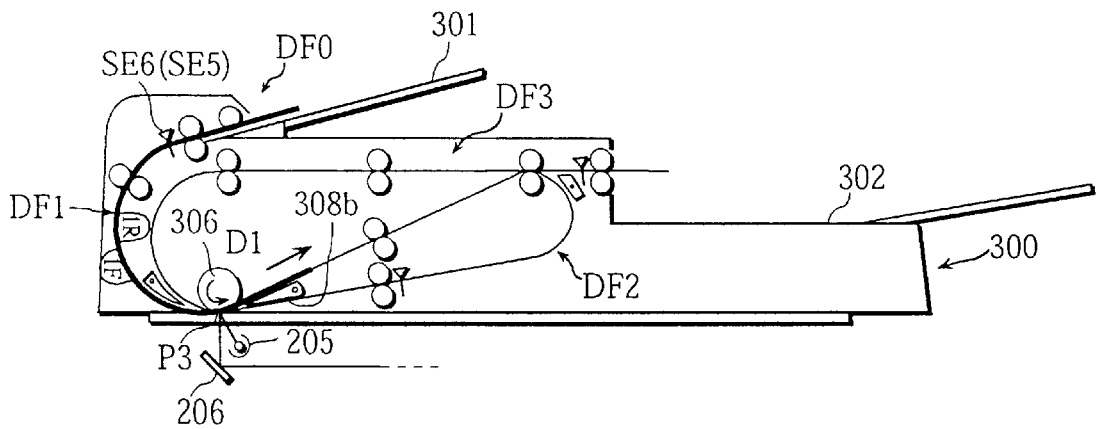
FIGS. 3A to 3C show the feeding operation in the case where the automatic document feeder longitudinally feeds A3 size documents.
Figure 3B:
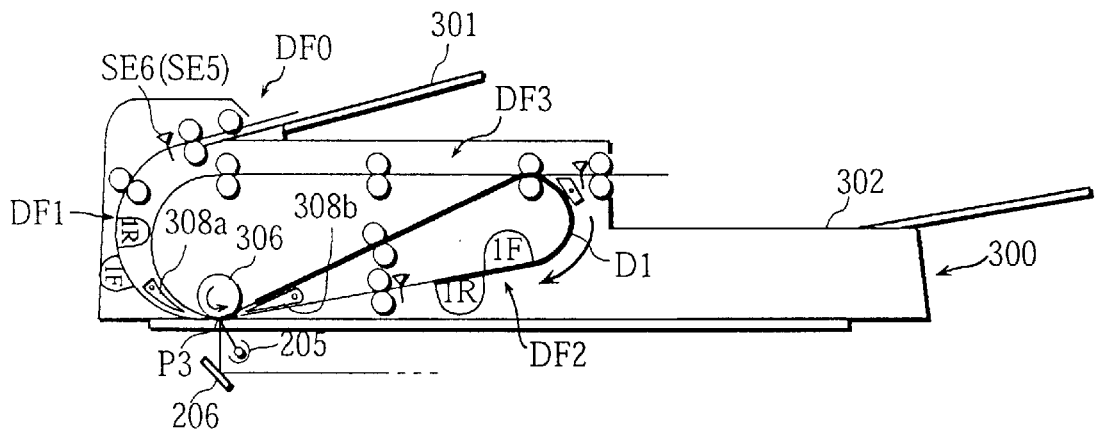
Figure 3C:
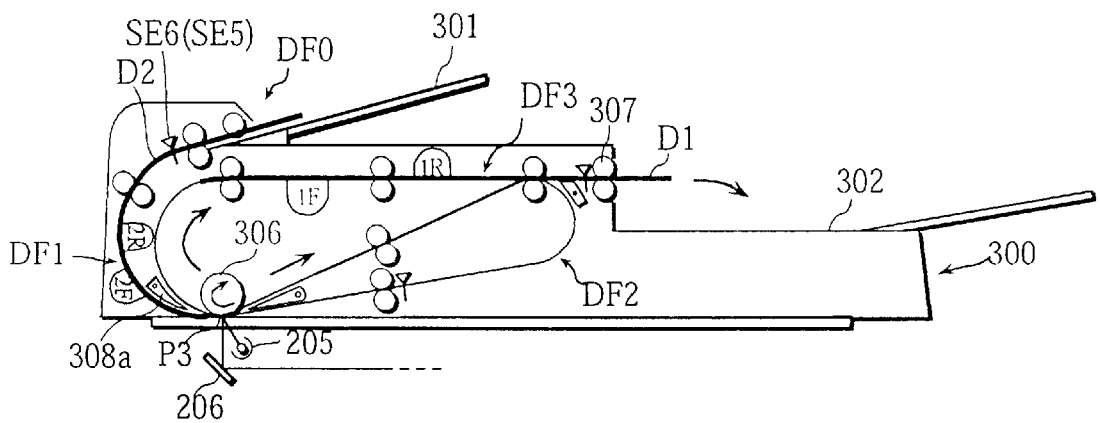

FIGS. 3A to 3C show the case where a document of the largest readable size is being transported. In these figures, A3 size documents placed longitudinally (hereinafter referred to as "A3T" ) are transported so as to perform two-sided document reading.

The first document D1 is transported from the document feed tray 301 to the document reading position P3 by the document feeding unit DF0 and the first transport unit DF1 (FIG. 3A). Here, the document reading position roller 306 rotates in the direction of the arrow in the figure, and the edge of the switching claw 308b is tilted downward, so that the first document D1 is led into the upper transport path of the second transport unit DF2 and transported back to the document reading position P3 (FIG. 3B).

The transport path length of the second transport unit DF2 is longer than the longitudinal length of an A3 size document by only a predetermined short length, so that after reading the front side of the first document D1 (1F), the top end of the first document D1 is near the document reading position P3, and the reverse side of it can be read after a very short interval.

The document reading position roller 306 then starts rotating backward, when the switching claw 308a is tilted downward so as to introduce the document D1 into the third transport unit DF3 leading to the discharged document receiving unit 302 (FIG. 3C). When the bottom end of the document D1 is guided into the transport path of the third transport unit DF3, the next original document transported by the first transport unit DF1 is near the document reading position P3, where the document reading position roller 306 starts rotating forward again. The above procedure is repeated for reading both sides of the next document D2.

With this structure, there is no need to suspend the document transport as in the conventional case where a document is guided into a switchback transport path for re-feeding, and successive re-feeding is possible using the U-shaped transport path of the second transport unit DF2. Furthermore, since the transport path of the second transport unit DF2 is only a bit longer than the document length in the transport direction, the reverse-side reading can be performed right after the end of the front-side reading.

When reading only the front side, the switching claw 308c is tilted to the left, so that the original document is transported through the upper transport path of the second transport unit DF2 and discharged onto the discharged document receiving unit 302 via the discharging rollers 307.

The following is a description of the case where A4 size documents, half the size of the above A3 size documents, are transported transversely (hereinafter referred to as "A4Y") in the two-sided document reading mode, with reference to FIGS. 4A to 4E.

Since the length of an A4Y size document is half the length of the above A3T size document in the transport direction, two A4T size documents can be contained at once in the transport path of the second transport unit DR2.

Figure 4A:
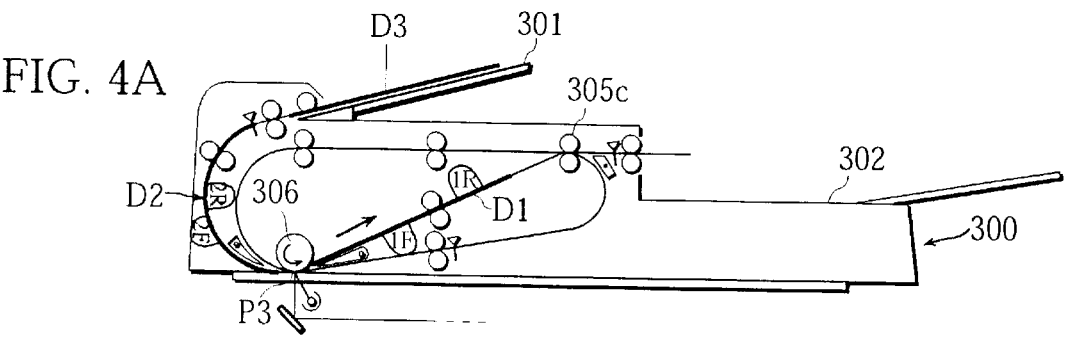
FIGS. 4A to 4E show the feeding operation in the case where the automatic document feeder transversely feeds A4 size documents.
Figure 4B:
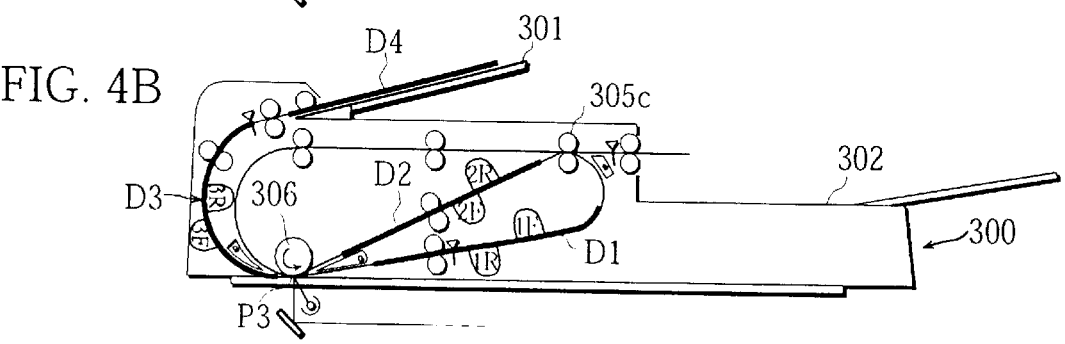
Figure 4C:
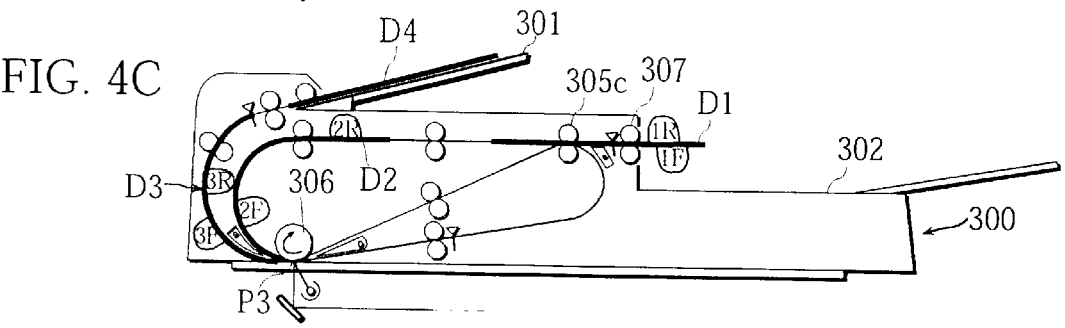

The first A4Y size document D1 is transported to the document reading position P3 by the document feeding unit DF0 and the first transport unit DF1. The switching claw 308b is tilted downward to introduce the first document D1 into the upper transport path of the second transport unit DF2. When the bottom end of the document D1 passes the document reading position P3, the top end of the next document D2 is near the document reading position P3 (FIG. 4A). When the bottom end of the document D2 passes the document reading position P3, both the documents D1 and D2 are contained in the transport path of the second transport unit DF2. At this point, the top end of the first document D1 is close to the document reading position P3 with the reverse side facing downward (FIG. 4B). The document reading position roller 306 then starts rotating backward, and the switching claw 308a is tilted downward, so that both documents D1 and D2 are guided into the transport path of the third transport unit DF3 leading to the discharging rollers 307 (FIG. 4C).

Figure 4D:
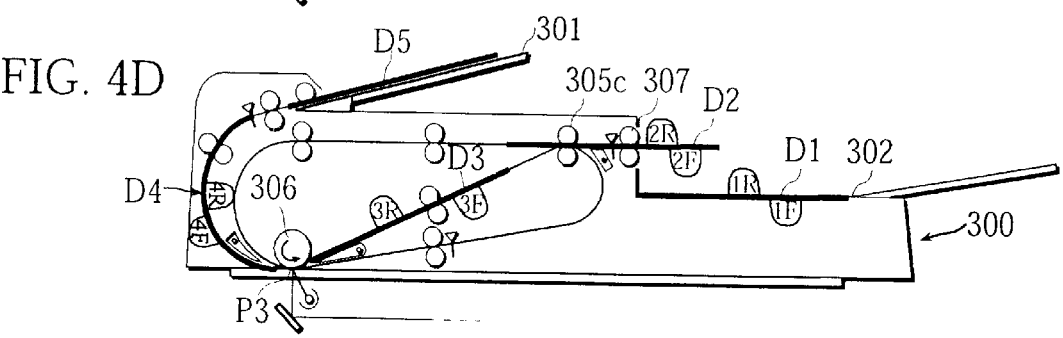
Figure 4E:
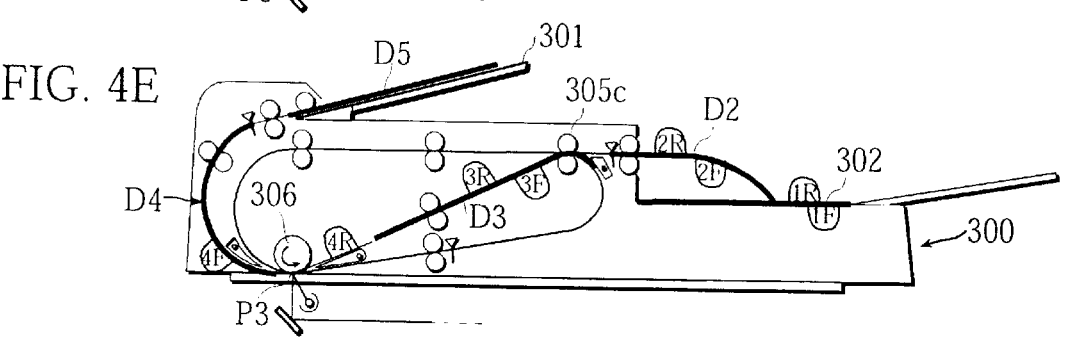

At this point, the third document D3 transported by the first transport unit DF1 is already near the document reading position P3, and the switching claw 308a is tilted upward. The document reading position roller 306 then starts rotating forward so as to introduce the document D3 into the upper transport path of the second transport unit DF2 via the document reading position P3 (FIG. 4D).

At this point, however, the second document D2 is still passing through the transport rollers 305c. Accordingly, it is necessary for the second document D2 to pass through the transport rollers 305c before the top end of the third document D3 reaches the transport rollers 305c.

To achieve this, the feeding of the third document from the document feeding unit DF0 to the first transport unit DF1 may be delayed, but this will slow down the overall reading operation. In this embodiment, the transport speed of the third transport unit DF3 is set higher than the transport speed of the second transport unit DF2. Assuming that the transport path length between the document reading position roller 306 and the transport rollers 305c in the upper transport path of the second transport unit DF2 is L1, the transport speed in L1 is V1, the transport path length between the document reading position roller 306 and the transport rollers 305c in the transport path of the third transport unit DF3 is L2, and the transport speed in L2 is V2, the transport speed V2 is set so that the following relation can be established:

$$L1/V1 > L2/V2 \text{ or } V2 > (L2/L1)*V1$$

Accordingly, when transporting a document toward the second transport unit DF2, the rotation speed of the document reading position roller 306 is controlled so as to be equal to the transport speed V1. When transporting a reversed document toward the third transport unit DF3, the rotation speed of the document reading position roller 306 is controlled so as to be equal to the transport speed V2. This speed change is also applied to the transport rollers 305c.

Accordingly, when transporting a document passing through the transport path of the second transport unit DF2, the rotation speed of the transport rollers 305c is controlled so as to be equal to the transport speed V1, and when transporting a document passing through the transport path of the third transport unit DF3, the rotation speed of the transport rollers 305c is controlled so as to be equal to the transport speed V2.

It should be understood that the transport speed V1 is set equal to the moving speed of the scanner 204 in the stationary document scan mode, but it may be set at a particular speed in the moving document scan mode by changing intervals between generating clock pulses for reading a documents in pixels.

In the one-sided document reading mode, the above complicated speed control operation is not necessary. Instead, the switching claw 308c is tilted to the left, so that documents successively fed to the document reading position P3 are discharged onto the discharged document receiving unit 302 via the upper transport path of the second transport unit DF2 and the discharging rollers 307.

The timing of above transport operation is controlled by a CPU 407 (shown in FIG. 7) in the control unit 400.

The following is a detailed description of the transport path length of the second transport unit DF2. Assuming that the total transport path length of the second transport unit DF2 is La and the length of an A3T size document in the transport direction is Lg, the following relation is established:

$$La = Lg + Ls$$

wherein Ls is much smaller than Lg. As can be seen from FIG. 3, if Ls is set at the same value as the sheet interval in the one-sided document reading mode, two-sided document reading can be performed at the same speed as the reading speed in the one-sided document reading mode.

Meanwhile, when A4Y size documents are read in the two-sided document reading mode, Ls is set at twice the length of the sheet interval in reading A4Y size documents in the one-sided document reading mode, so that the two-sided document reading can be performed at the same speed as the reading speed in the one-sided document reading mode. Accordingly, Ls is set by comparing the length of the sheet interval in reading A3T documents in the one-sided document reading mode with twice the length of the sheet interval in reading A4Y documents in the one-sided document reading mode, and selecting the greater one.

The length La of the second transport unit DF2 can be easily set as described above, based on the sheet intervals in the one-sided document reading mode. It is possible to determine the length Ls from the document transport speed, the throughput of the CPU 406 in the memory unit 220, and the time elapsed from the start of the backward rotation of the document reading position roller 306 for the reverse-side reading until its peripheral speed is stabilized. Accordingly, a high-performance CPU in place of the CPU 406 in the memory unit 220 and a high-precision controllable motor as a drive mechanism for the document reading position roller 306 can further minimize the value of Ls.

The transport path length La of the second transport unit DF2 may be substantially the same as the length of an A3T size document in the transport direction, as long as the top end of the document does not meet with the bottom end of the document in the document reading position P3. At the end of the front-side reading of the document, the top end of the document almost reaches the document reading position P3. If the document reading position roller 306 requires some time to stabilize (or a time required by the memory unit 220), the document transport is suspended for the required period of time, and it is then resumed. By doing so, the transport path length of the second transport unit DF2 may be equal to the length of an A3T size document in the transport direction. Even if the document transport is suspended as described above, the document reading time will not be prolonged, because the suspended time is substantially equal to the time required for an original document to go through the length Ls.

When transporting documents having a longer length than A4Y in the transport direction (B4T, for instance), the transport path of the second transport unit DF2 cannot contain two documents at once, and therefore, a transport control operation is performed as in the case of A3T size documents described above (see FIG. 3). When transporting documents having a shorter length than A4Y in the transport direction (B5Y, for instance), a transport control operation is performed as in the case of A4Y size documents described above (see FIG. 4). Hereinafter, the former transport control will be referred to as "large size two-sided document transport control", and the latter as "small size two-sided document transport control".

If B4T or B5Y size documents are read in the two-sided document reading mode, the speed of reading documents will be a bit lower than the speed of reading A3T or A4Y size documents in the two-sided document reading mode, because the transport path length of the second transport unit DF2 is far too long compared with the document length in the transport direction. The lowered speed, however, is still far from higher than the speed of reading two-sided documents in a conventional switchback method of reversing an original document by guiding it into a switchback path.

In the automatic document feeder 300 of the present invention, the transport direction in the front-side reading is different from the transport direction in the reverse-side reading in the document reading position P3, i.e., the front-side reading direction of the scanner is different from the reverse-side reading direction of it. Because of this, the image data obtained by reading the reverse-side of an original document need to be written into the memory in a modified writing order or read out in a modified reading order, but such a memory control operation will be described later.

The image reader unit 200 is equipped with an operation panel 500 for receiving instructions from users on its front side, where it is easy for the users to operate.

Figure 5:
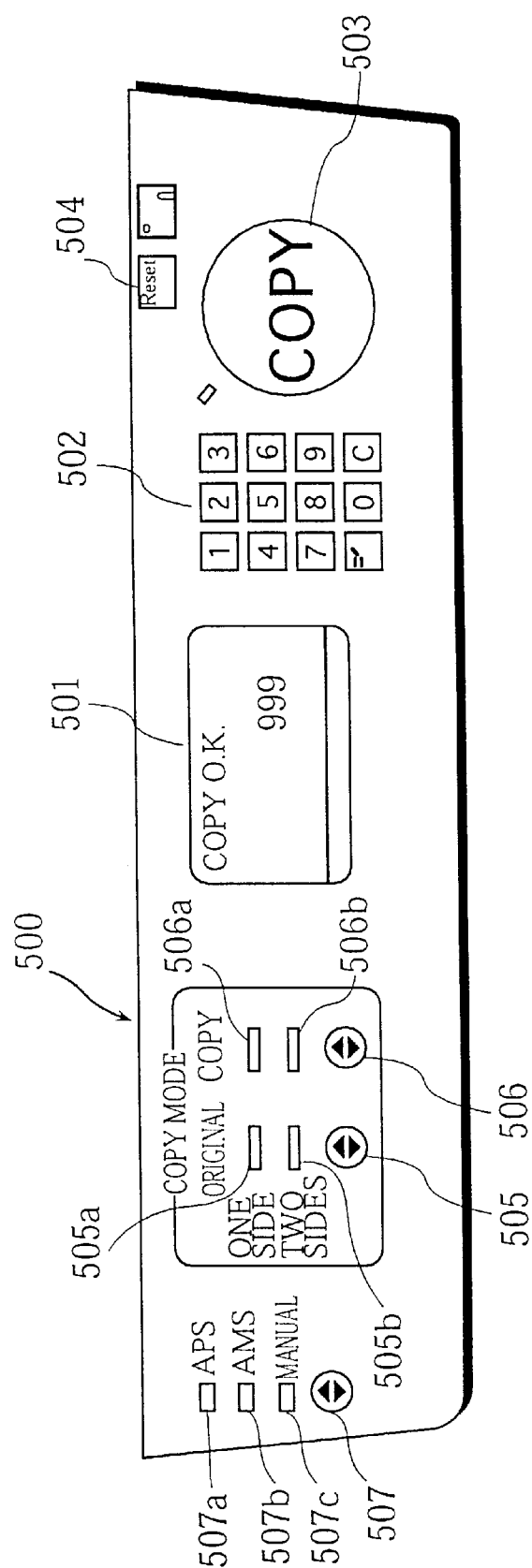
FIG. 5 shows an example structure of the operation panel of the copying machine.

FIG. 5 shows an example structure of the operation panel 500, which comprises: a liquid crystal display 501 for displaying the number of copies and so on; a 10-keypad 502 for inputting the number and magnification of copies, and so on; a start key 503 for sending an instruction to start copying; a panel reset key 504 for resetting conditions set in the copying machine to the standard values; a document reading mode setting key 505 for switching between the one-sided document reading mode and the two-sided document reading mode; LEDs 505a and 505b for indicating the current document reading mode; a copy mode setting key 506 for switching between the one-sided copy mode and the two-sided copy mode; LEDs 506a and 506b for indicating the current copy mode; a document size determination mode setting key 507 for selecting one mode among an APS mode, an AMS mode, and a manual mode in which the paper size and the magnification of copies are determined manually; and LEDs 507a, 507b, and 507c for indicating the current document size determination mode.

In FIGS. 1 and 2, signs SE1 to SE8 indicate reflex-type photoelectric sensors each provided with a light emitting element and a light receiving element. Among them, the sensors SE1 to SE4, SE7, and SE8 detect a jam (paper jam). If the bottom end of an original document (or copy paper) is not detected after a predetermined period of time has passed since the detection of the top end of the original document, the sensors will judge that a jam has occurred in the copying machine. The sensors SE5 and SE6 are document size determination sensors, the size determination operation of which will be described later. Contact-type sensors, such as microswitches, may be used for these sensors, too.

(2) Structure of the Control Unit 400

Figure 6:
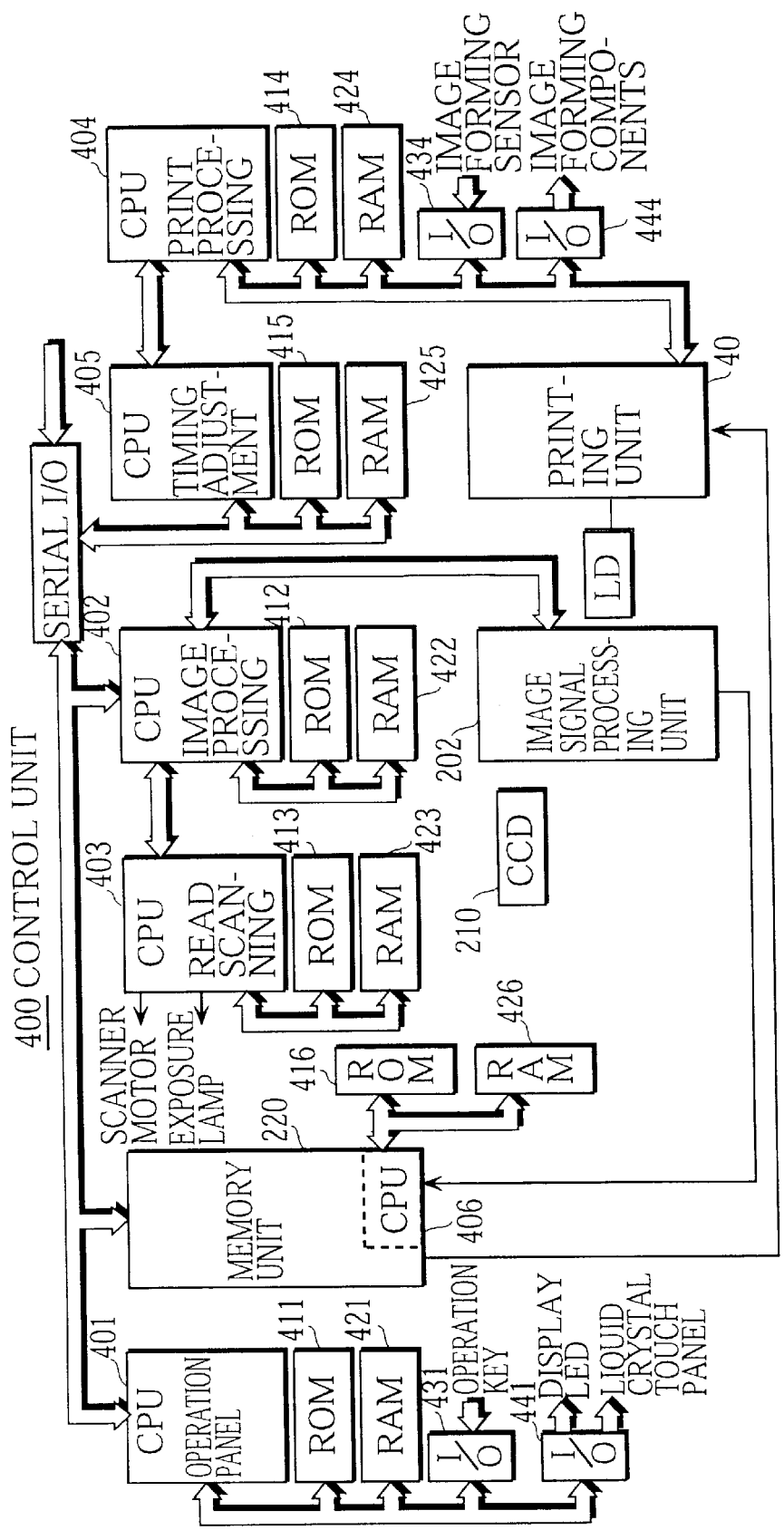
FIG. 6 is a block diagram of the control unit of the copying machine.
Figure 7:
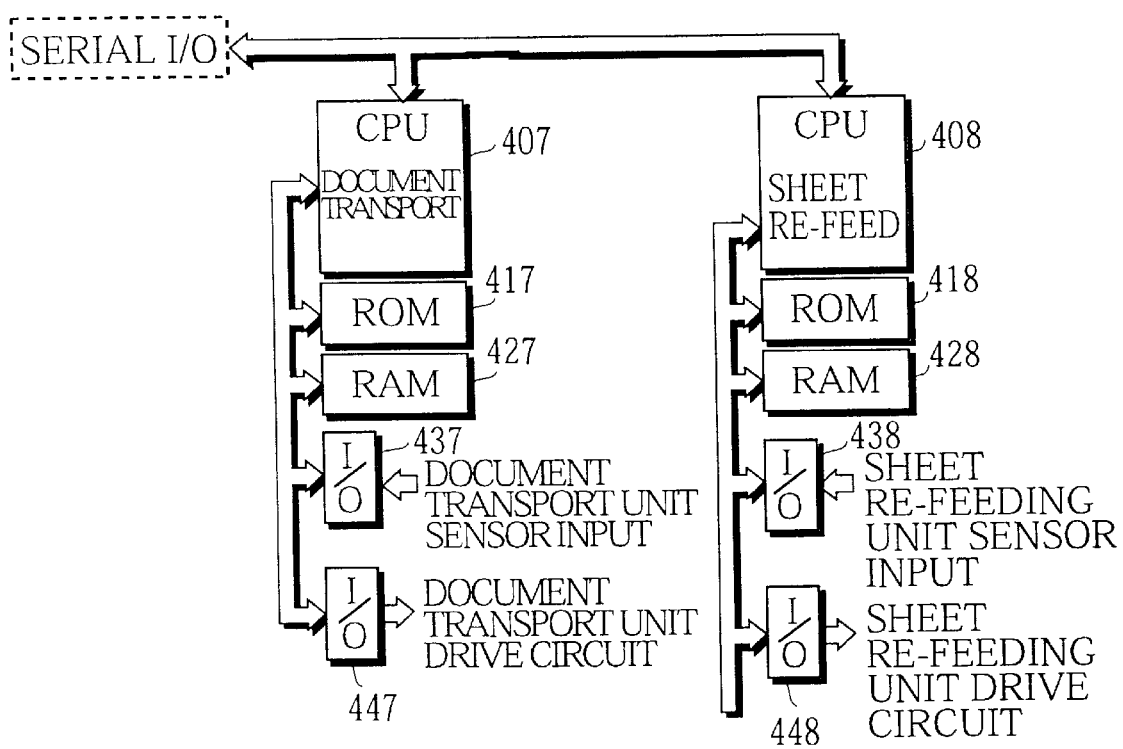
FIG. 7 is a block diagram of the remaining part of the control unit of the copying machine.

The following is an explanation of the control unit 400 provided in the copying machine described so far, with reference to the block diagrams of FIGS. 6 and 7.

Although the memory unit 220 is shown separately from the control unit 400 for ease of explanation in FIG. 1, it may be considered to be included in the control unit 400 as a control system. So, the memory unit 220 will be described as a part of the control unit 400 in the following.

The control unit 400 has eight CPUs 401 to 408 as its main components, and the CPUs 401 to 408 include ROMs 411 to 418 storing the control program for each CPU and RAMs 421 to 428 used as the work area when executing each program.

The CPU 401 informs other CPUs of instructions sent from the operation panel 500, controls the displays on the operation panel 500, receives signals from various operation keys on the operation panel 500 via an I/O port 431, and controls the display on the liquid crystal touch panel and the lighting of the indication LEDs.

The CPU 402 controls each component of the image signal processing unit 202, which comprises an A/D converter, a shading correction unit, an MTF correction unit, a magnification change unit, and a gamma correction unit. Inputted image data are controlled by the CPU 402, converted into multi-valued digital signals by the A/D converter, sent to the shading correction unit to correct unevenness of the light from the exposure lamp 205 and sensitivity irregularity of the CCD sensor 210, subjected to edge sharpening by the MTF correction unit for image quality improvement, subjected to magnification change by the magnification change unit, subjected to gamma correction by the gamma correction unit, and finally outputted to the memory unit 220.

The CPU 403 controls the drive of the scanning system 201. For instance, it controls the scanning to determine the driving direction of the scanner motor M2 and the reading direction in the main scanning of the image data. The CPU 403 also controls the switching operation of the exposure lamp 205.

The CPU 404 collectively controls the printing unit 40, the optical unit 60, and the image forming unit 2, so that the printing can be performed based on the image data outputted from the memory unit 220.

A program for the print control is stored in the ROM 414, and according to this program, the CPU 406 inputs the image data outputted from the memory unit 220 into the printing unit 40, and controls the output of a laser diode (LD) disposed inside the optical unit 60. The CPU 406 also controls the operations of the driving unit of each element of the image forming system through an I/O port 444 so as to perform printing on a copying sheet.

In the meantime, the detection signals of each sensor in the image forming system are inputted through an I/O port 434. For instance, in accordance with the determination values from a temperature sensor and a humidity sensor as well as a density determination sensor for determining the amount of toner stuck to the surface of the photosensitive drum 2a (these sensors are not shown in the figure), the output of the sensitizing charger and the transfer charger is controlled so that the optimum reproduction image can be attained. Also, in accordance with detection signals from copying sheet size determination sensors 23a, 23b, and 23c, a sheet cassette is suitably selected and the feeding operation is controlled. The above-mentioned jam detection sensors SE1 to SE4 transmits a signal to notify a paper jam, and through the CPU 401, the liquid crystal touch panel 501 on the operation panel 500 indicates that a paper jam has occurred.

The CPU 405 collectively controls the overall routine process of adjusting the timing and setting the operation mode by selecting a suitable control program from the ROM 415 and measuring the timing by an internal timer to achieve a smooth copying operation.

The CPU 406 is disposed inside the memory unit 220. It temporarily stores the image data outputted from the image signal processing unit 202 into the image memory 223 (shown in FIG. 8), and reads them out to send to the printing unit 40. By writing the image data temporarily into the memory unit 220, it becomes unnecessary to control the image reader unit 200 and the printer unit 100 synchronously, and the image reading and the printing can be controlled efficiently. Thus, the copy speed in the two-sided copy mode can be higher.

The CPU 407 (shown in FIG. 7) controls the automatic document feeder 300, adjusting the drive circuit of each component via an I/O port 447, according to the control program stored in the ROM 417. The CPU 407 switches the transport path between the two-sided document mode and the one-sided document mode, as described above, and controls the process of transporting the original documents placed on the document feed tray 301 to the document reading position P3 on the image reader unit 200.

Detection signals are inputted from the jam detection sensors SE7 and SE8 as well as the document size determination sensors SE5 and SE6 via an I/O port 437, and according to these inputted detection signals, the document size is determined and a paper jam is detected.

The CPU 408 controls the re-feeding operation of the duplex unit 10, switching the transport path between the two-sided copy mode and the one-sided copying mode, so that a reversed copying sheet with an image formed on one side is discharged onto the discharged sheet receiving tray 12 or transported to the transferring position 6 for back-side image formation through the sheet re-feeding path 9. The drive control of each component is performed through an I/O port 448. A paper jam is detected from the sensor input of the jam detection sensors SE4 and others through an I/O port 438.

Among the CPUs 401 to 408, serial communication is conducted through interruptions to receive commands, reports, and other data.

When the copying machine is switched on, the CPUs 401 to 408 are initialized by the initialization program read from the ROM of each CPU, and time measuring is commenced by an internal timer so that each routine is performed in a predetermined period of time.

The following is an explanation of the structure of the memory unit 220, with reference to the block diagram of FIG. 8.

As shown in the figure, the memory unit 220 includes the CPU 406 for controlling the overall operation of the memory unit 220, the ROM 416 for storing the control program, the RAM 426 serving as a work area, a switching unit 221 for switching between input and output of image data, a binary processing unit 222 for creating binary data in accordance with the parameter setting of the CPU 406, a multi-port image memory 223 which can hold image data contained in one A4Y page at 400 dpi, a code processing unit 224 comprising a compressor 231 and an expandor 232, each being operable independently, a multi-port code memory 225, a sub-scan direction reading order reversing unit 226 for reversing, when necessary, the reading order of the image data in the sub-scan direction stored in the image memory 223, and a multi-valued processing unit 227 for creating multi-valued data in accordance with the parameter setting of the CPU 406.

The image memory 223 and the code memory 225 are provided with multi-ports. Since the compressor 231 and the expandor 232 can operate independently of each other, the writing and the reading of the image data can be performed in parallel.

Image data D2 inputted into the memory unit 220 having the above structure are converted into binary data by the binary processing unit 222, and then written into the image memory 223. The code processing unit 224 reads the binary data from the image memory 223, compresses the binary data with the compressor 231, and writes them in a predetermined memory area in the code memory 225. Here, an administrative table to show memory areas and page numbers corresponding to code data is created in the RAM 426, and the memory is administered according to this table. The code data of a page designated by the CPU 406 are read out in accordance with the above administrative table, and then expanded by the expandor 232 to create image data, which are in turn written into the image memory 223.

The image data written into the image memory 223 are read out in the sub-scan direction in an order changed by the sub-scan direction reading order reversing unit 226 in response to an instruction from the CPU 406. The read image data are then converted into multi-valued data by the multi-valued processing unit 227, and the multi-valued image data are outputted as image data D3 to the printing unit 40 (shown in FIG. 6) via the switching unit 221.

The sub-scan direction reading order reversing operation by the sub-scan direction reading order reversing unit 226 is controlled so that images can be reproduced in a direction corresponding to the document transport direction in the document reading position P3 in the moving document scan mode.

Figure 9A:
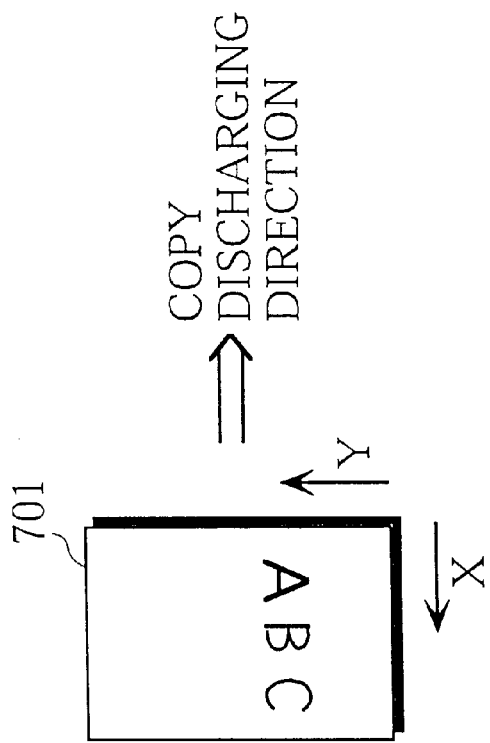
FIGS. 9A and 9B show a result of image formation on a copy sheet by reading the front side of an original document.
Figure 9B:
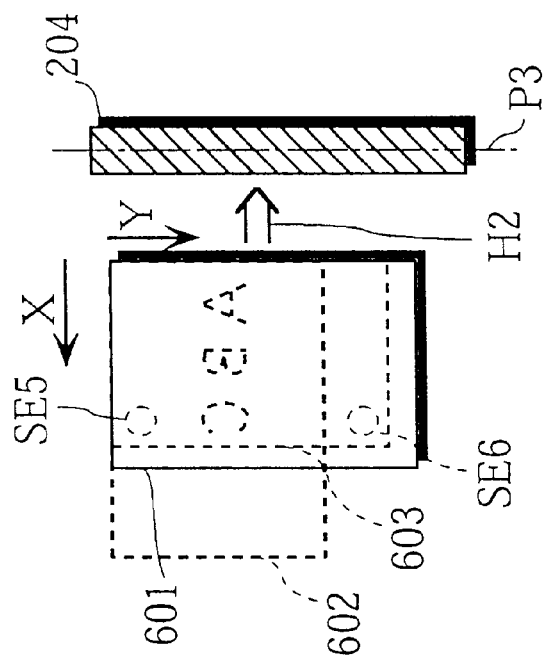

For instance, in the case where an A4Y size document 601 having "ABC" printed on both sides thereof in the Y-axis direction (main-scan direction), which is perpendicular to the X-axis direction (sub-scan direction), is read as shown in FIG. 9A, the document is transported to the document reading position P3 in the transport direction H2, and the front-side of it is read in the X-axis direction and the Y-axis direction. The memory readout control is performed so that an image faithful to the original can be reproduced on a copying sheet as shown in FIG. 9B.

Figure 10A:
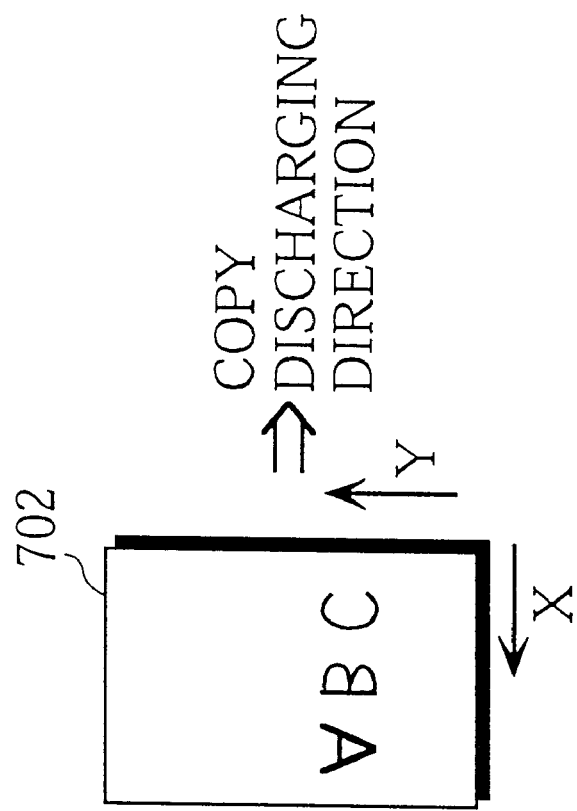
FIGS. 10A and 10B show a result of image formation on a copying sheet by reading the reverse side of the original document without changing the memory reading order.
Figure 10B:
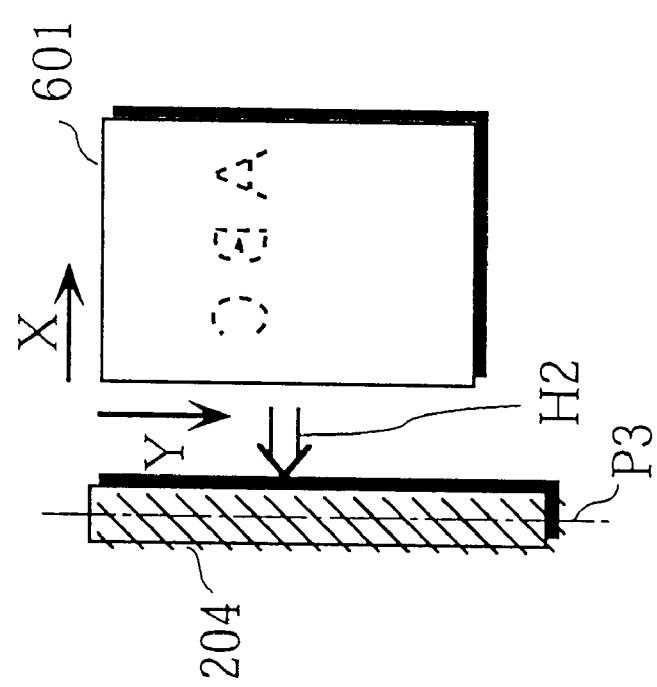

After the document 601 is turned over in the second transport unit DF2, it is transported in the transport direction H2, and its reverse side is read as shown in FIG. 10A. If the sub-scan direction reading order is not changed and remains as in the front-side reading, the output image will be the reverse image as shown by a copied sheet 702 in FIG. 10B.

In this embodiment, when reading image data of the reverse-side of an original document under the control of the CPU 406, the memory control is performed so that the reproduction image is correctly outputted by inverting the memory reading order by the sub-scan direction reading order reversing unit 226.

Figure 11:
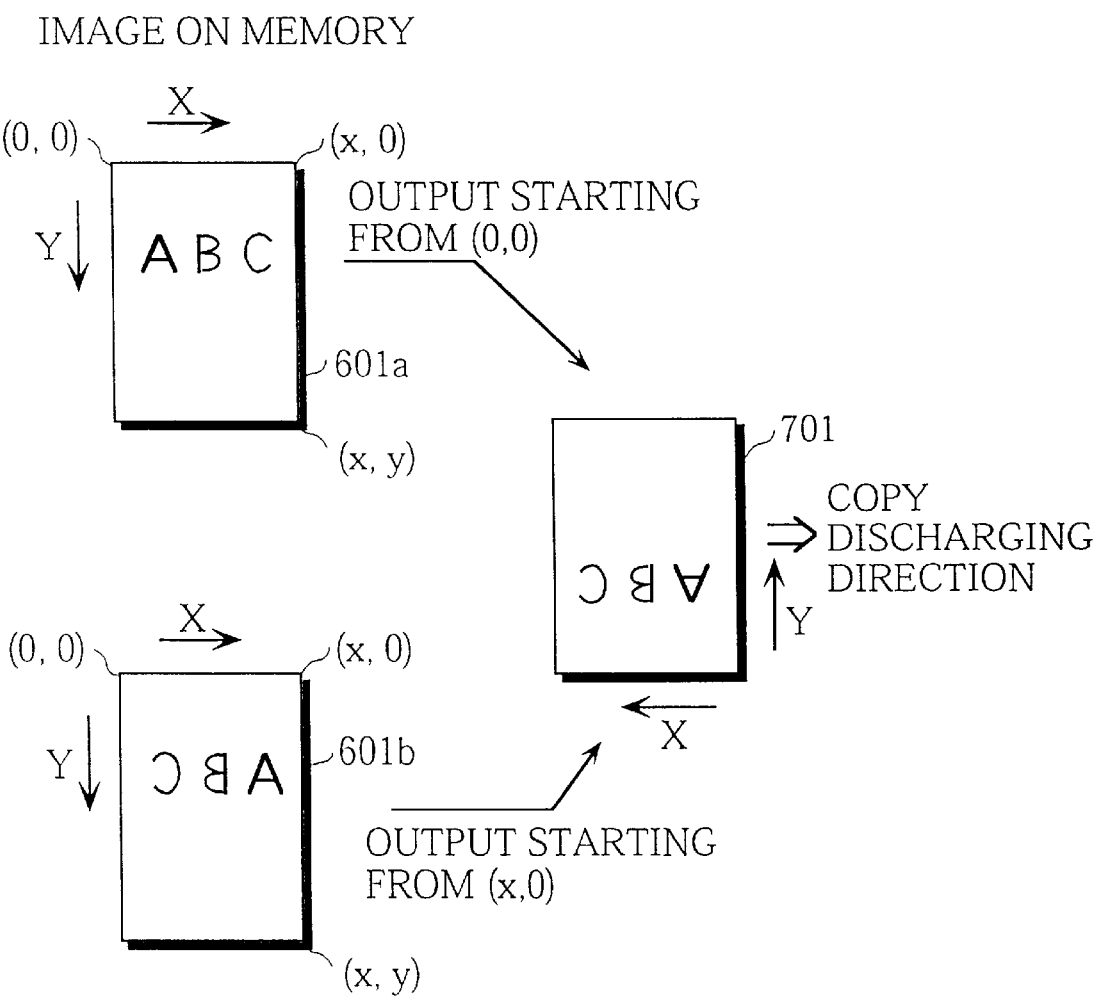
FIG. 11 shows the process of forming an image by reading out corresponding image data stored in the memory.

The memory image obtained by reading the front-side of an original document is formed from the address (0, 0) to the address (x, y) as shown by a memory image 601a in FIG. 11. Accordingly, a reproduction image 701, which is faithful to the original image, can be formed by reading out starting from the address (0, 0). The memory image obtained by reading the reverse-side of the original document is shown by a memory image 601b in FIG. 11, and therefore, the faithful reproduction image 701 can be formed by reading out starting from the address (x, 0).

(3) Control Operation of the Control Unit 400

Figure 12:
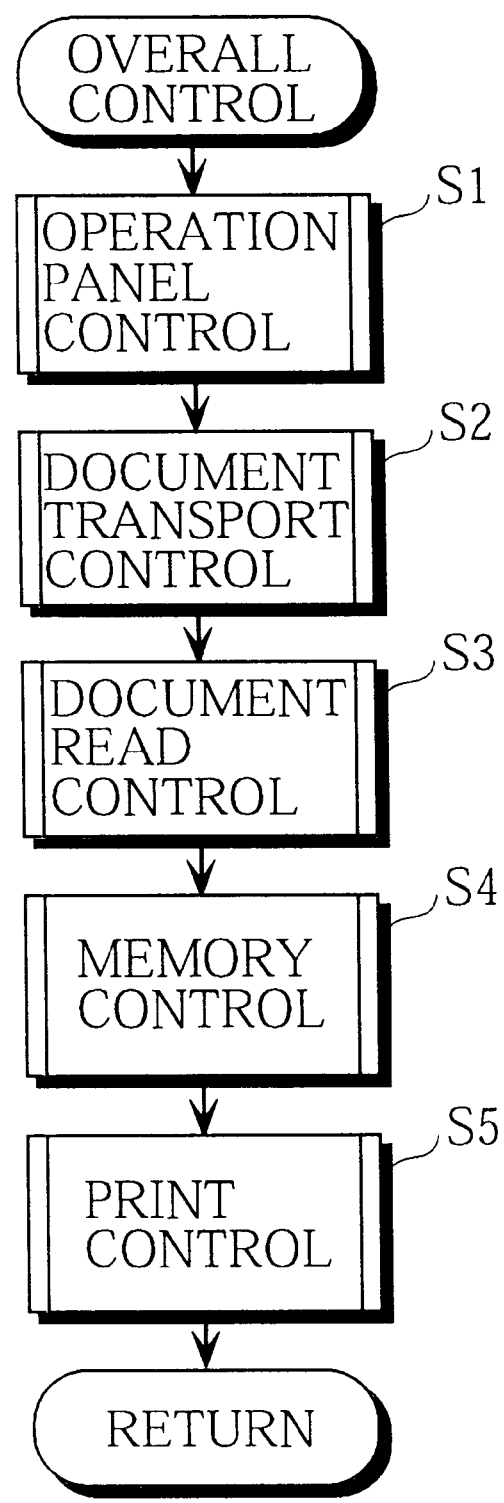
FIG. 12 is a flowchart showing the main routine of controlling the overall copying operation.

FIG. 12 shows the main routine of the control operation of the control unit 400. After the control operation for the key input and displays of the operation panel 500 (step S1), the control unit 400 controls the document feeding operation of the automatic document feeder 300 (step S2), controls the document reading operation of the image reader unit 200 (step S3), controls the reading from and writing into the memory (step S4), and controls the printing operation of the printer unit 100 based on the image data (step S5).

The CPU 405 collectively controls the overall operation of the copying machine, setting commands, such as start and stop, and operation modes for the other CPUS. For this reason, the control operation of the CPU 405 is explained below with reference to the flowchart of FIG. 13.

When the copying machine is switched on, the initialization program is read from the RAM 415 to initialize (step S61) (such an initializing operation is performed for each CPU, and hereinafter, it will be referred to "initialization"), and the internal timer starts measuring time so that each routine is performed in a predetermined period of time (steps S62 and S68).

The data inputted through interrupt communication from each CPU are analyzed (step S63), and according to the analysis, operation mode setting is conducted (step S64). When command setting is performed (step S65), commands to execute the operation modes set in step S64 are created, and the command data are set in an output area for outputting through communication (step S66). Then, other necessary processes are finally performed (step S67).

The CPU 405 administrates the overall timing, analyzes the data received from other parts, and sets commands based on the analysis, so as to balance the operations between the CPUs and control the overall copying operation, as shown in the flowchart of FIG. 12.

The following is an explanation of the control operations in the numerical order shown in the flowchart of FIG. 12.

(3-1) Operation Panel Control

Figure 14:
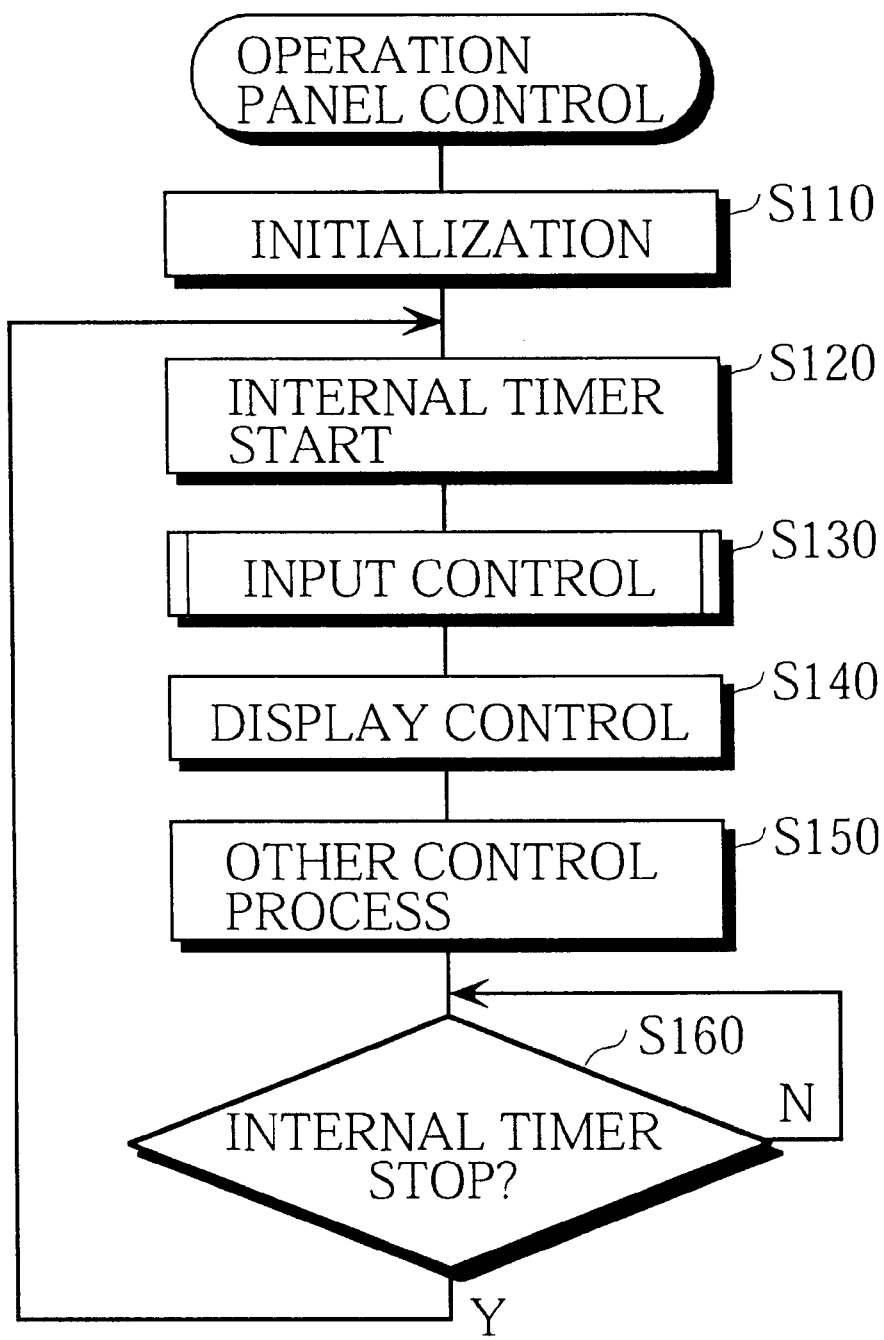
FIG. 14 is a flowchart of the main routine of the operation panel control in the flowchart of FIG. 12.

FIG. 14 is a flowchart showing the main routine of the operation panel control in step S1 of FIG. 12.

As mentioned above, the operation panel control is performed by the CPU 401. After initialization (step S110), the internal timer is started to administrate so that each process routine is performed in a fixed period of time (steps S120 and S160). Input control through the operation panel 500 (step S130) and display control for the operation panel 500 (step S140) are then performed, followed by other control operations (step S150). In each process, communication with other CPUs 402 to 408 is performed through interruptions, if necessary.

Figure 15:
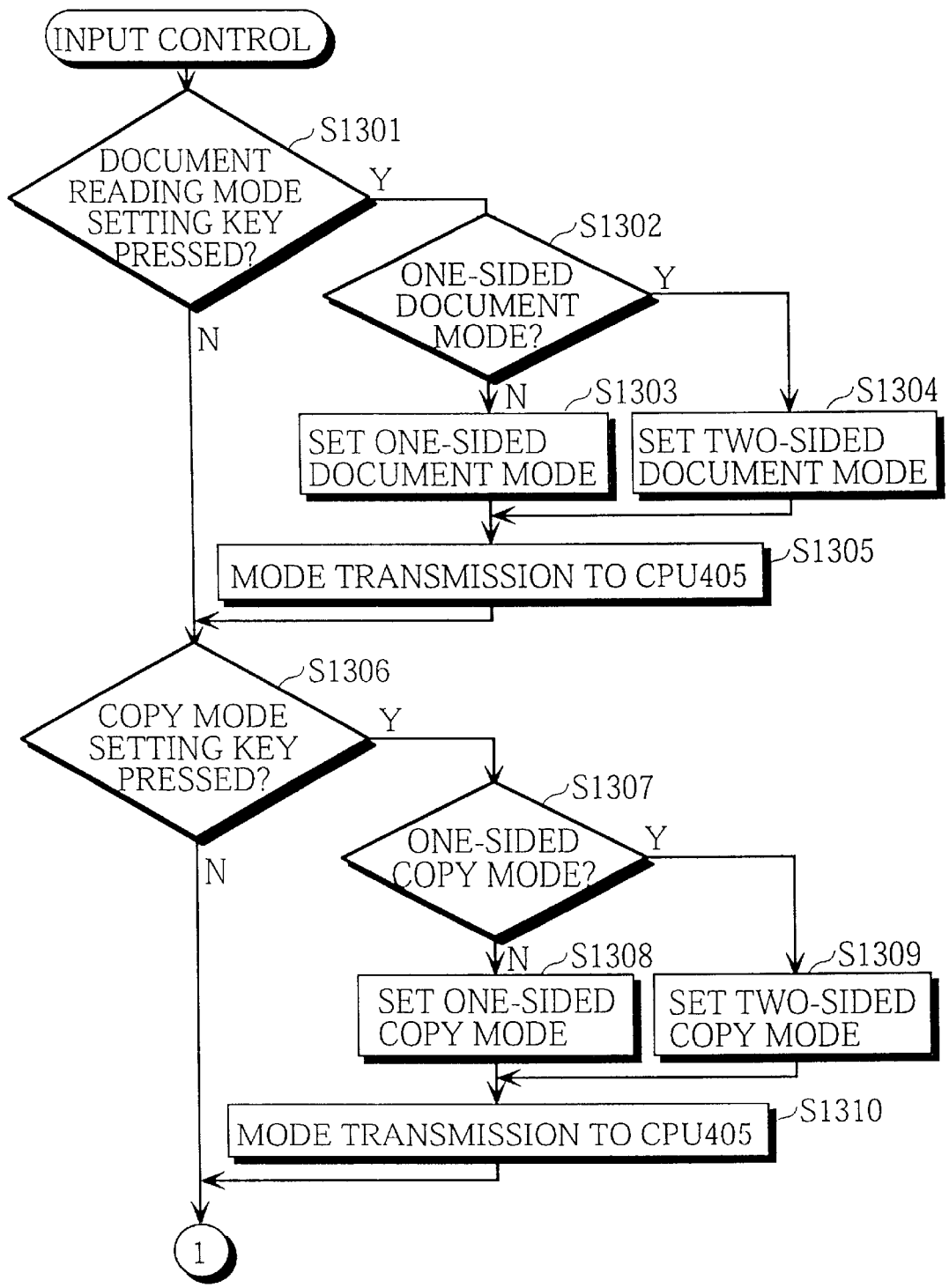
FIG. 15 is a flowchart of the subroutine of the input control in the flowchart of FIG. 14.
Figure 16:
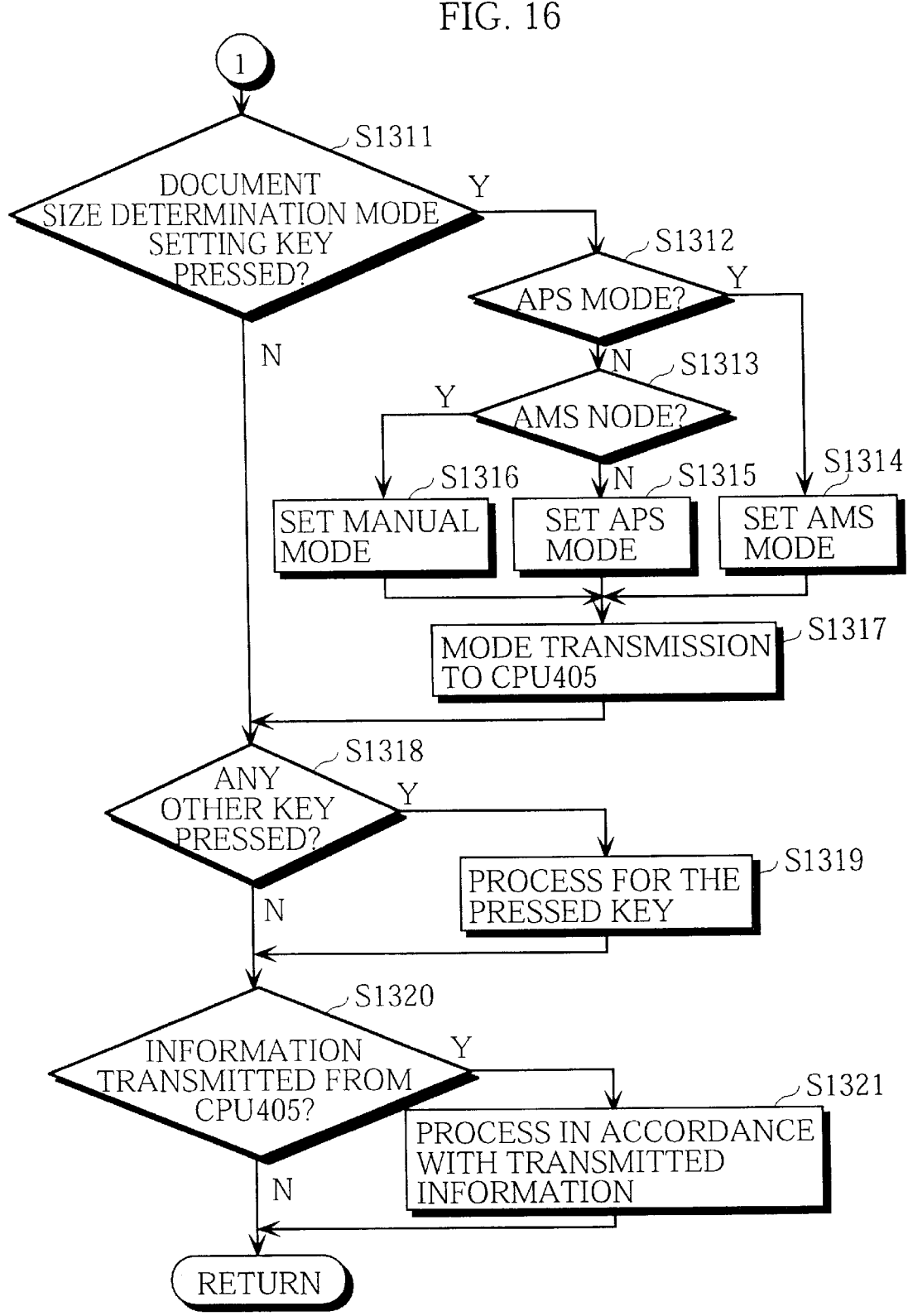
FIG. 16 is a flowchart showing the remaining part of the subroutine of FIG. 15.

FIGS. 15 and 16 are flowcharts showing the subroutine of the input control performed in step S130 described above. In this input control, the CPU 405 is informed of a setting change, e.g., a mode change, ordered through the operation keys on the operation panel 500.

In the flowchart of FIG. 15, if the one-sided document mode has already been set at the time of pressing the document reading mode setting key 505 (shown in FIG. 5), the document reading mode is switched to the two-sided document reading mode (steps S1301, S1302, and S1304), and if the two-sided document reading mode has already been set, instead of the one-sided document reading mode, at the time of pressing the document reading mode setting key 505, the document reading mode is switched to the one-sided document reading mode (steps S1301, S1302, and S1303). The CPU 405 is informed of the switching of the document reading mode (step S1305).

Meanwhile, if the one-sided copy mode has already been set at the time of pressing the copy mode setting key 506, the copy mode is switched to the two-sided copy mode (steps S1306, S1307, and S1309), and if the two-sided copy mode has already been set, instead of the one-sided copy mode, at the time of pressing the copy mode setting key 506, the copy mode is switched to the one-sided copy mode (steps S1306, S1307, and S1308). The CPU 405 is informed of the switching of the copy mode (step S1310).

In FIG. 16, if the APS mode has already been set at the time of pressing the document size determination mode setting key 507, the document size determination mode is switched to the AMS mode (steps S1311, S1312, and S1314), and if the AMS mode has already been set, instead of the APS mode, at the time of pressing the document size determination mode setting key 507, the document size determination mode is switched to the manual mode (steps S1312, S1313, and S1316). If the AMS mode has not been set in step S1313, the APS mode is set. The document size determination mode is switched in the order of the APS mode, the AMS mode, and the manual mode, through the document size determination mode setting key 507. The CPU 405 is informed of the switching of the document size determination mode (step S1317).

When any other key is pressed, a process designated by the pressed key is performed (steps S1318 and S1319). For instance, when the number of copies to be made is specified through the 10-keypad 502, the CPU 405 is informed of the specified number.

If there is further information transmitted from the CPU 405, a process relevant to the information is performed (steps S1320 and S1321). For instance, a signal is transmitted from the CPU 405 every time a copy is completed, and the displayed number on the liquid crystal display 501 is reduced one by one every time the signal is received.

(3-2) Document Transport Control

Figure 17:
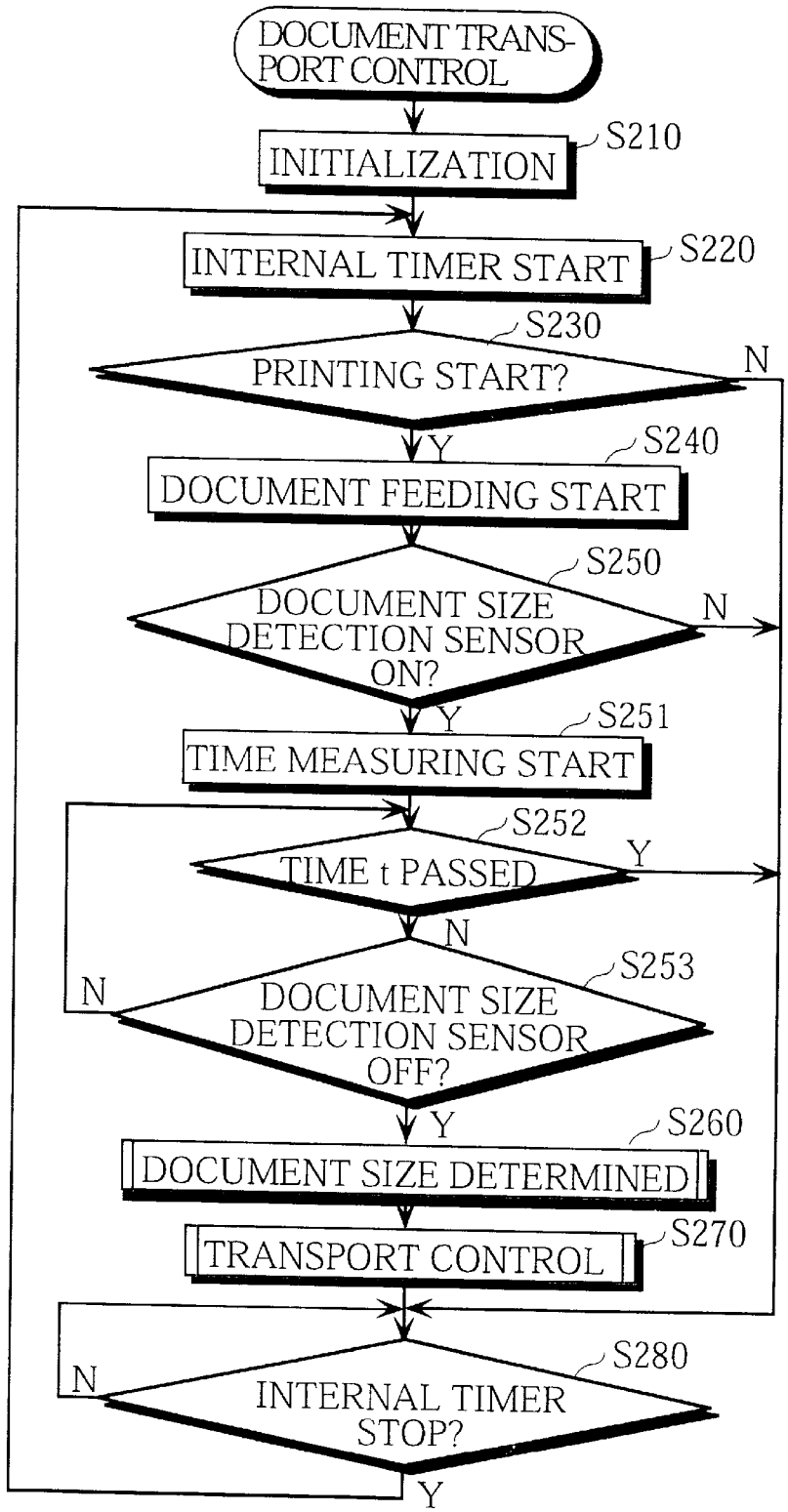
FIG. 17 is a flowchart showing the main routine of the document transport control in the flowchart of FIG. 12.

FIG. 17 is a flowchart showing the main routine of the document transport control in step S2 of FIG. 12.

As described above, the document transport control is conducted by the CPU 407, and after initialization (step S210), the internal timer starts to administrate the timing so that the routine is performed in a predetermined period of time (steps S220 and S280).

Upon receipt of a command to start printing from the CPU 405 (step S230), the document feeding unit DF0 starts feeding original documents one by one (step S240). When an original document reaches the document reading position P3, the document size determination sensors SE5 and SE6 determine the size of the original document (steps S250 to S253).

The document size determination sensors SE5 and SE6 are disposed in the closest vicinity to the document feeding unit DF0 in the transport path of the first transport unit DF1, as shown in FIG. 2 (i.e., past the separating rollers 304). Both of the sensors SE5 and SE6 are arranged in parallel in the main operation direction (the direction of Y axis), as shown in FIG. 9A. The document size determination sensor SE5 is disposed in such a position that it can detect original documents of all sizes passing through the transport path of the first transport unit DF1. The document size determination sensor SE6 does not determine the width of an A4T size document 602, but it does determine the width of a B5Y size document 603. Being arranged in this way, the document size determination sensor SE6 mainly determines the time elapsed since the detection of the top end of an original document, and the document size determination sensor SE6 mainly determines the width of the original document. According to the results of both sensors combined, the size of the original document is determined.

After the document feeding unit DF0 starts feeding original documents in step S240, the document size determination sensor SE5 is turned on through the detection of the top end of an original document (step S250), and besides the time measuring for routine time control by the internal timer, time measuring for document size determination is commenced.

The time measuring is continued until the document size determination sensor SE5 is turned off in step S253, and based on the measured time (the time elapsed since the detection of the top end of the document) and the detection signal from the document size determination sensor SE5, the size of the original document is determined in step S260.

If an original document is not detected in step S250, the routine does not come to an end until the internal timer stops. If an original document is detected and the time measuring is commenced (step S251), and if a predetermined time t has already passed before the detection of the bottom end of the original document (step S252), the routine does not come to an end until the internal timer stops (step S280). The time t is a bit longer than the time required for an A3T size document, which is the largest readable size, to pass the document size determination sensor SE5 at the transport speed of the first transport unit DF1.

In the case where the document size determination sensor SE5 detects no original documents, it is considered that no original documents have been set, and therefore, the liquid crystal display 501 on the operation panel 500 should display a message, "please set documents", for instance. In the case where the document size determination sensor SE6 is not turned off even after the predetermined period of time t, it is considered that a paper jam has occurred, and therefore, the liquid crystal display 501 should display a message, "paper jam", so that the operation of the copying machine can be smoother.

The time elapsed since the detection of the top end of an original document is determined when the document size determination sensor SE5 is turned off in step S253, and the size of the original document is determined in step S260, based on the time elapsed since the detection of the document's top end and the detection signal of the document width determined by the document size determination sensor SE6.

Figure 18:
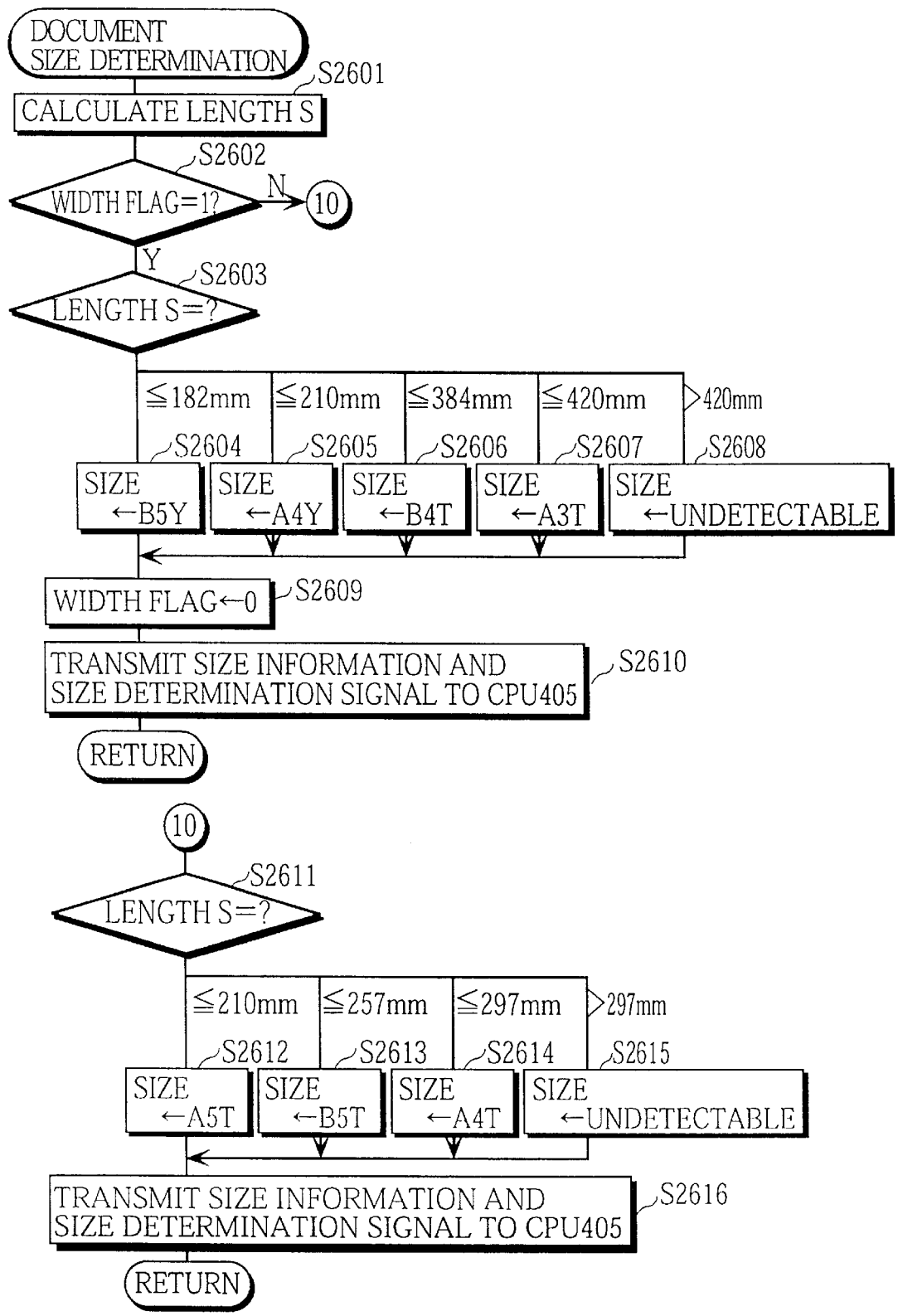
FIG. 18 is a flowchart showing the subroutine of the document size determination in the flowchart of FIG. 17.

FIG. 18 is a flowchart showing the subroutine of the document size determination.

Firstly, the length S in the document transport direction is calculated from the time elapsed between the detection of the document's top end and the detection of the document's bottom end, and the transport speed of the first transport unit DF1 (step S2601). A width flag is judged whether to be 1 or not in step S2603. The width flag is set in the RAM 427 (shown in FIG. 7) depending on whether the document size determination sensor SE6 is turned on or off. If the determined document size is larger than the width of B5Y in the transport direction, the width flag is set at "1", and in other cases, it remains "0".

The size of an original document is specified by the width flag and the document length S calculated in step S2602. When the width flag is "1", an original document of a larger size than B5Y is being transported, and therefore, the document size is selected from B5Y, A4Y, B4Y, and A3T in accordance with the status of the width flag and the document length S (steps S2604 and S2607). If the length S is over 420 mm (the length of an A3T size document in the transport direction) due to partially overlapped documents being transported at once, no applicable document size can be found and the document size remains unknown (step S2608). In such a case, the operation panel 500 should indicate a message, "feed error", for instance, through the CPU 401.

After the document size determination, the width flag is reset at "0" in step S269, and the CPU 405 receives the information as to the determined document size and a signal to notify that the document size has been determined (step S2610).

Meanwhile, if the width flag is "0" in step S2602, the width of the original document is smaller than a B5Y size document, and the document size is selected from A5T, B5T, and A4T in accordance with the status of the width flag and the document length S (steps S2612 to S2614). If the document length S is over 297 mm (the length of an A4T size document in the transport direction) due to partially overlapped documents being transported at once, no applicable document size is found and the document size remains unknown (step S2615). In such a case, the operation panel 500 should indicate a message, "feed error", for instance, through the CPU 401.

After the document size is determined as described above, the CPU 405 receives the information as to the document size and a signal to notify the determination of the document size (step S2616). At this point, the subroutine comes to an end.

The document size determining operation is followed by the transport control of step 270 in FIG. 17.

Figure 19:
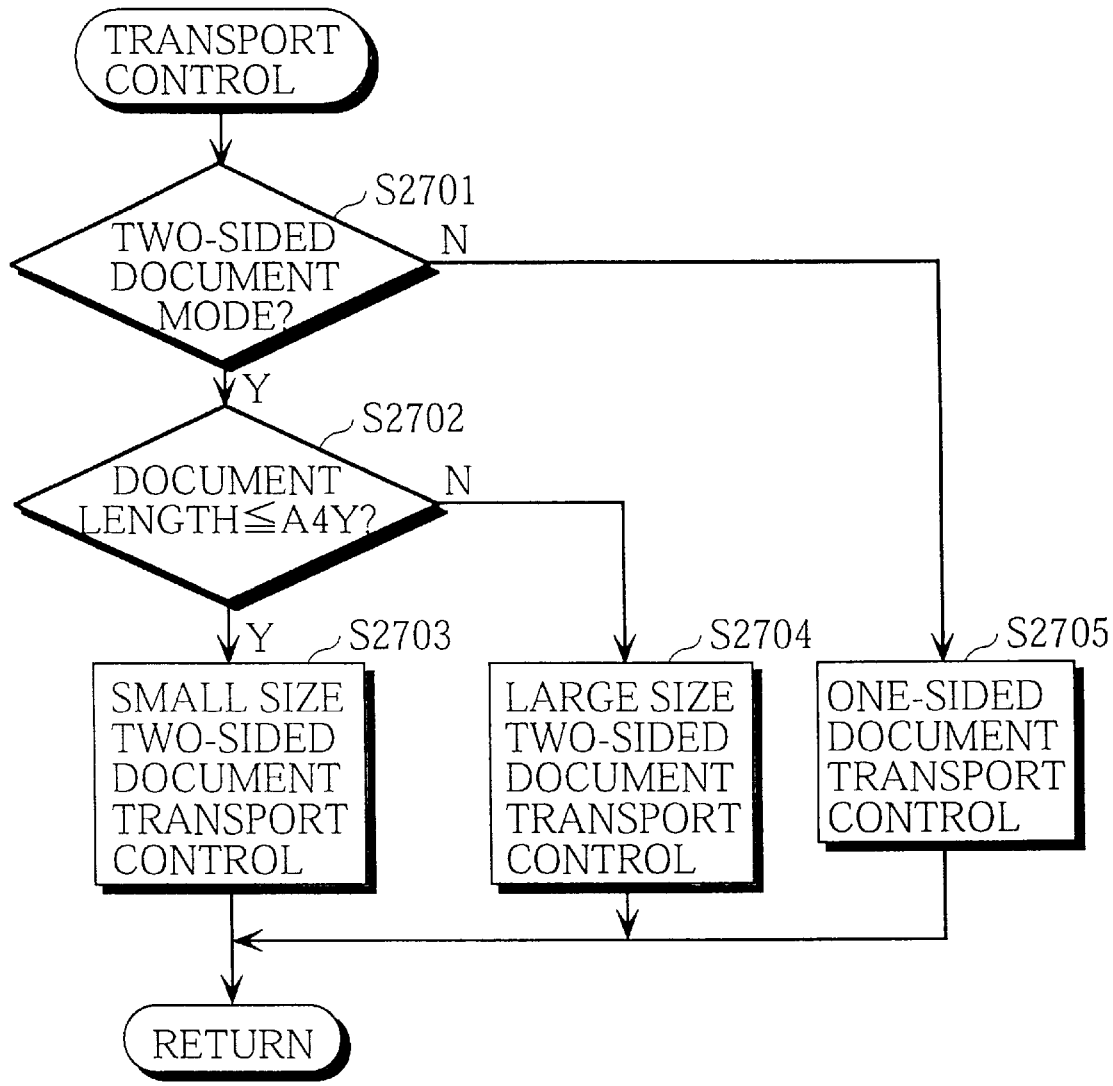
FIG. 19 is a flowchart showing the subroutine of the transport control in the flowchart of FIG. 17.

FIG. 19 is a flowchart showing the subroutine of the transport control. Firstly, according to a command transmitted from the CPU 405 (see step S1310 in FIG. 15 and step S66 in FIG. 13), the current document mode is judged whether it is the two-sided document mode or not (step S2701). If it is not the two-sided document mode, one-sided document transport control is performed (step S2705). This one-sided document transport control is conducted in the following manner. The switching claw 308c (shown in FIG. 2) is tilted to the left, original documents are fed to the document reading position P3 at predetermined intervals, the front sides of the original documents are read, the original documents are transported through the upper transport path in the second transport unit DF2, and finally the original documents are discharged onto the discharged document receiving unit 302 via the transport rollers 305c (shown in FIG. 2) and the discharging rollers 307.

If the current document mode is judged to be the two-sided document mode in step S2701, the document length S is judged whether it is longer than an A4Y size document (step S2702). If the document length S is not longer than an A4Y document, the small size two-sided document transport control is performed (step S2703), and if the document length S is longer than an A4Y document, the large size two-sided document transport control is performed (step S2704).

After the relevant transport control is conducted, the subroutine comes to an end.

(3-3) Document Reading Control

Along with the document transport control described above, the document reading control is performed in the image reader unit 200 (step S3 in FIG. 12).

Figure 20:
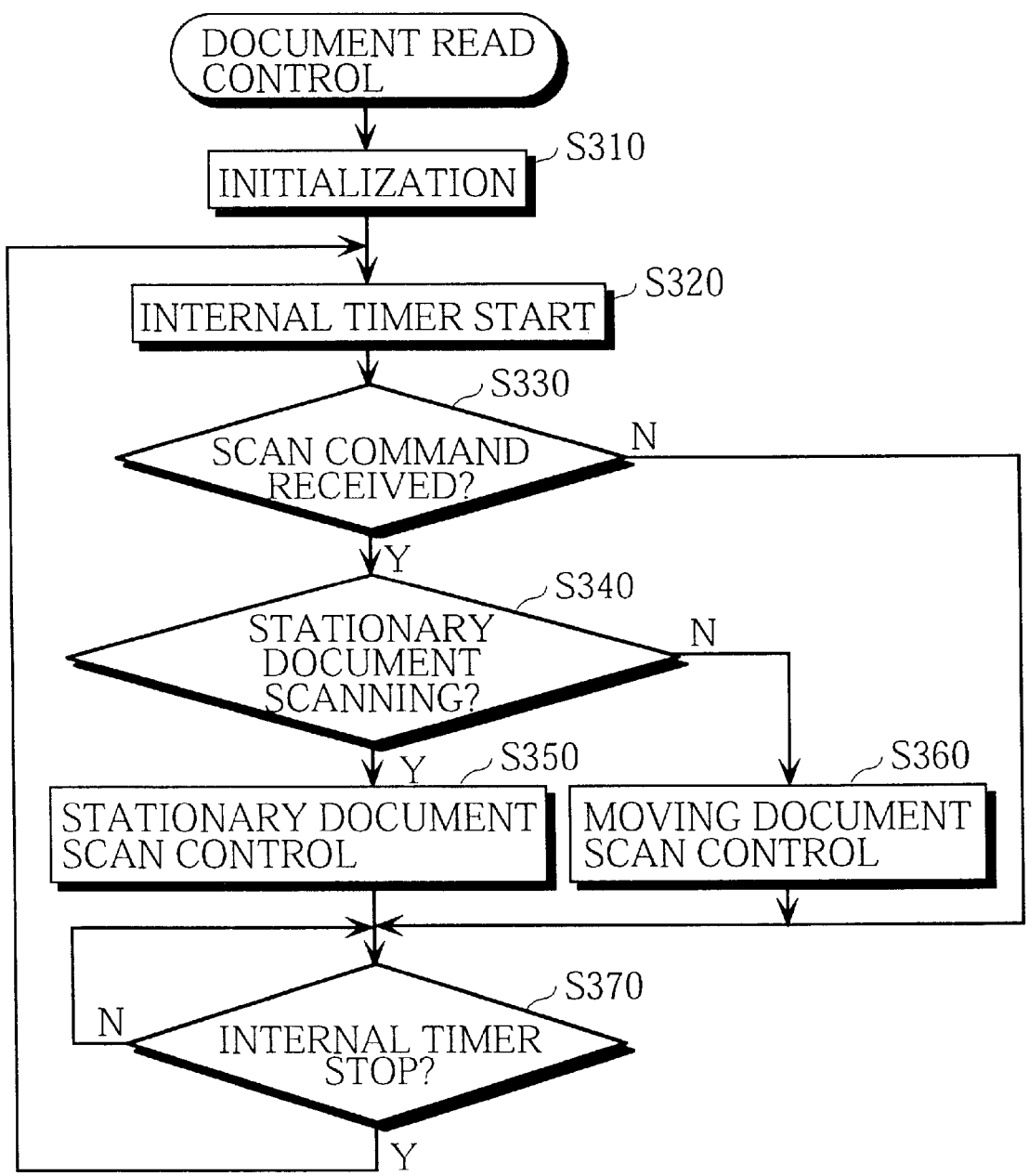
FIG. 20 is a flowchart showing the subroutine of the document reading control in the flowchart of FIG. 12.

FIG. 20 is a flowchart showing the subroutine of the document reading control by the CPU 403. After initialization (step S310), the internal timer starts to control the timing so that the routine is invariably performed in a predetermined period of time (steps S320 and S370). Upon receipt of a command to start scanning from the CPU 405 (step S330), the current document scan mode is judged whether it is the stationary document scan mode or the moving document scan mode (step S340).

This judgement on the scan mode is conducted by a document size determination sensor disposed below the platen glass 203. If this sensor detects an original document, the scan mode is judged to be the stationary document scan mode, and in other cases, the scan mode is judged to be the moving document scan mode.

In the case of the stationary scan mode, a stationary scan control is performed (step S350), and in other cases, a moving document scan control is performed (step S360).

Under the stationary document scan control, the scanner motor M2 (shown in FIG. 2) moves the scanner 204 from the reading point P1 to the reading point P2 on the platen glass 203 to read the information on an original document placed on the platen glass 203. Meanwhile, under the moving document scan control, the scanner 204 is moved to the reading point P3 and fixed at this point to read the information on an original document transported by the automatic document feeder 300 at predetermined transport speed.

(3-4) Memory Control

The image data read in the manner described above are processed by the image signal processing unit 202 and then, under the control of the CPU 406, written into the memory unit 220, from which the image data are read out when necessary (see Memory Control in step S4 in FIG. 12).

Figure 13:
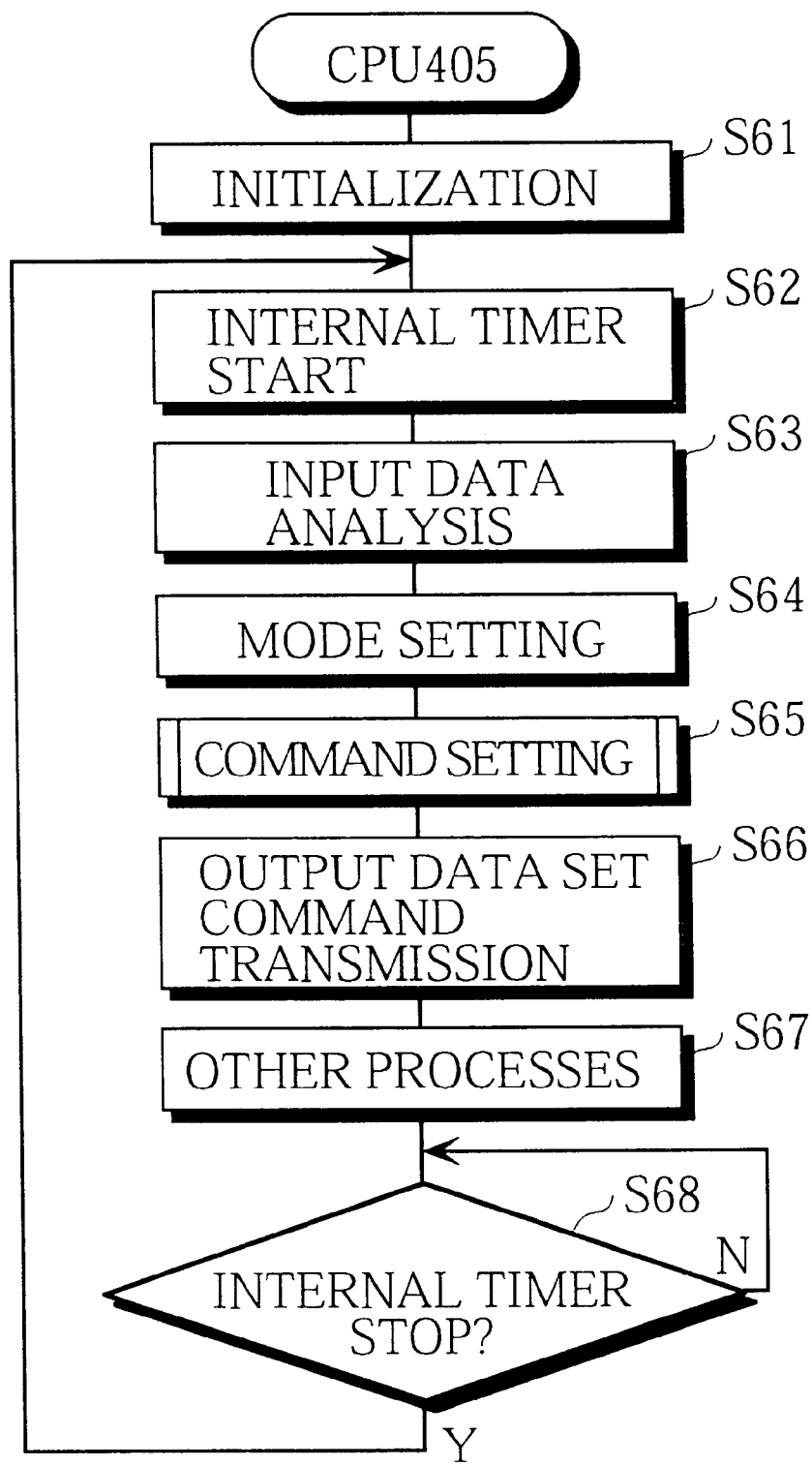
FIG. 13 is a flowchart showing the control operation of the CPU 405.
Figure 21:
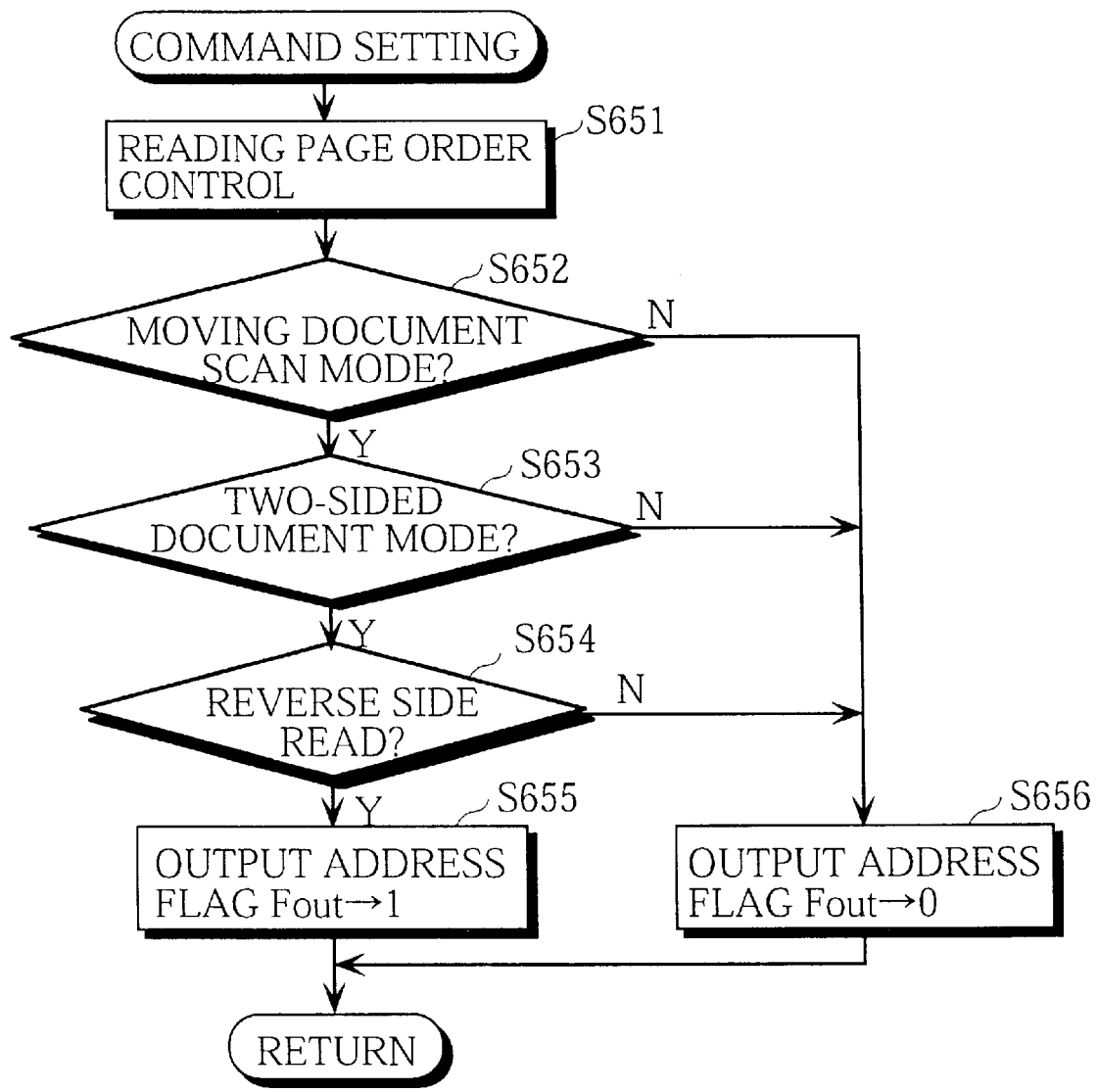
FIG. 21 is a flowchart showing the subroutine of the command setting by the CPU 405 when controlling the memory of FIG. 13.

FIG. 21 is a flowchart showing the process of setting a command for the CPU 406 to control the memory (see step S65 in FIG. 13).

Firstly, a reading page order control is performed for the CPU 406 (step S651). Under this page order control, the compressed image data of each page of the original documents in the reading order are read from the memory unit 220 in such an order that the copying operation is most effectively performed in each copy mode.

The following is a specific example of a reading page order when reading document information of eight pages, with reference to the tables in FIGS. 22A and 22B. The reference characters F and R in the tables indicate the front side and the reverse side of an original document or a copying sheet. In this embodiment, as described above, the number of copying sheets containable in the circular sheet transport path for two-sided copying in the printer unit 100 varies depending on the length of the copying sheets in the transport direction. In the tables of FIGS. 22A and 22B, examples of the number of copying sheets containable in the circular sheet transport path include three A3T size copying sheets and four A4Y size copying sheets.

FIG. 22A is a table showing the reading order in the one-sided document mode.

After image data of the front sides (1F to 8F) of the eight original documents are read in this order and compressed, the compressed image data are sequentially written into the code memory as code data. When reading the code data for one-sided copying, the code data are read in the writing order and expanded, and one-sided copying is then performed using the code data as printing data.

In the case of two-sided copying, the number of copying sheets containable in the circular sheet transport path varies depending on the length of the copying sheets in the transport direction, as described above, and therefore, the number of sheets to be fed successively is limited. As a result, the reading page order varies depending on the sheet size as described below.

In the case of A3T size copying sheets, only three of them can be fed. The front-side printing is repeated three times (1F, 3F, and 5F), and the reverse-side printing on the three copying sheets turned over by the duplex unit 10 is performed (2F, 4F, and 6F). The two-sided copied sheets are discharged onto the discharged sheet receiving tray 12. Another copying sheet is then fed for the front-side printing (7F) and the reverse-side printing (8F). Accordingly, the reading order is 1, 3, 5, 2, 4, 6, 7, 8, as shown in the table of FIG. 22A.

In the case of A4Y size copying sheets, four of them can be fed at once, and therefore, the front-side printing can be repeated four times (1F, 3F, 5F, and 7F), followed by four-time reverse-side printing (2F, 4F, 6F, and 8F). Accordingly, the reading order is 1, 3, 5, 7, 2, 4, 6, 8, as shown in the table of FIG. 22A.

FIG. 22B is a table showing the document reading order either in the one-sided copy mode or the two-sided copy mode, when reading both sides of four original documents in the two-sided document mode.

This table is divided into two sections, one being for the case of A3T size documents (upper section) and the other being for the case of A4Y size documents (lower section). Firstly, the upper section of the table is explained in the following.

In this case, as described in the explanation of the transport operations of FIG. 3, both sides of original documents are read one by one in the order of 1F, 1R, 2F, 2R, . . . , as shown in the table, and then written into the memory. Accordingly, in the one-sided copy mode, the readout should be performed in the writing order, 1, 2, 3, 4, 5, 6, 7, 8, as shown in the table.

Since only three A3T size copying sheets can be fed successively in the two-sided copy mode, the front-side copying is performed three times (1F, 2F, and 3F), and the reverse-side copying is then performed three times (1R, 2R, and 3R), followed by two-sided copying on one more copying sheet (4F and 4R). Accordingly, the reading order is 1, 3, 5, 2, 4, 6, 7, 8, as shown in the table.

In the case of A4Y size documents shown in the lower section of the table (also see FIGS. 4A to 4E), the front-sides of two original documents (1F and 2F) are read, and the reverse-sides of the two original documents (1R and 2R) are read. This two-sheet unit reading is repeated and the read data are written into the memory in that order. Accordingly, the reading order in the one-sided copy mode should be changed to 1F, 1R, 2F, 2R, . . . , or 1, 3, 2, 4, 5, 7, 6, 8, as shown in the table.

As four A4Y copying sheets can be fed successively in the two-sided copy mode, the front-side printing is performed four times (1F, 2F, 3F, and 4F), and the reverse-side printing is then performed four times (1R, 2R, 3R, and 4R). Accordingly, the reading order is 1, 2, 5, 6, 3, 4, 7, 8, as shown in the table.

Tables as shown in FIGS. 22A and 22B are stored in the ROM 414 in advance. According to the tables, the CPU 405 determines the reading order based on the document reading mode, document size, and copying sheet size. The CPU 406 is then informed of the determined reading order.

In the case where the copying machine is in the moving document scan mode and the two-sided document mode (steps S652 and S653 in FIG. 21), when reading the image data on the reverse side of an original document, an output address flag Fout is set at "1" (steps S654 and S655). If "NO" is designated in any of the steps S652, S653, and S654, the output address flag Fout is set at "0", and this subroutine comes to an end. As described later, the reading order in the sub-scan direction is determined from the status of the output address flag.

In accordance with the commands set by the CPU 405, the CPU 406 performs the memory control (step S4 in FIG. 12).

Figure 23:
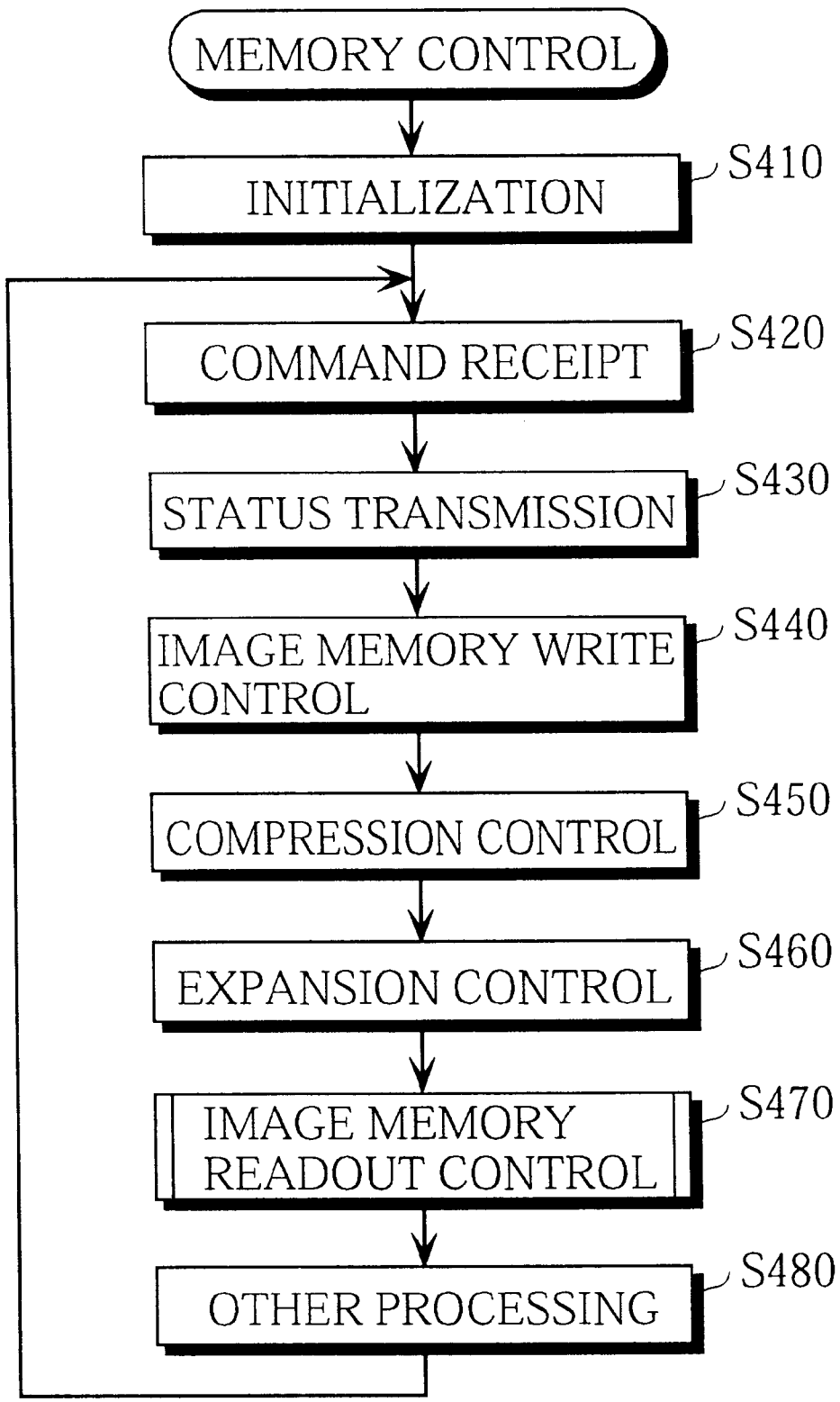
FIG. 23 is a flowchart showing the main routine of the memory control in the flowchart of FIG. 12.

FIG. 23 is a flowchart showing the main routine of the memory control operation of the CPU 406. After initialization (step S410), the CPU 406 receives commands from other CPUs (step S420), informs other CPUs of the memory writing order and so on (step S430), performs write control over the image memory 223 (step S440), and conducts compression control to convert image data into code data and store them into the code memory 225 (step S450). When reading from the code memory 225, the code data of a given page are expanded and then written into the image memory 223 (step S470), and other processing, such as rotation processing, is then performed (step S480), where the routine comes to an end.

Figure 24:
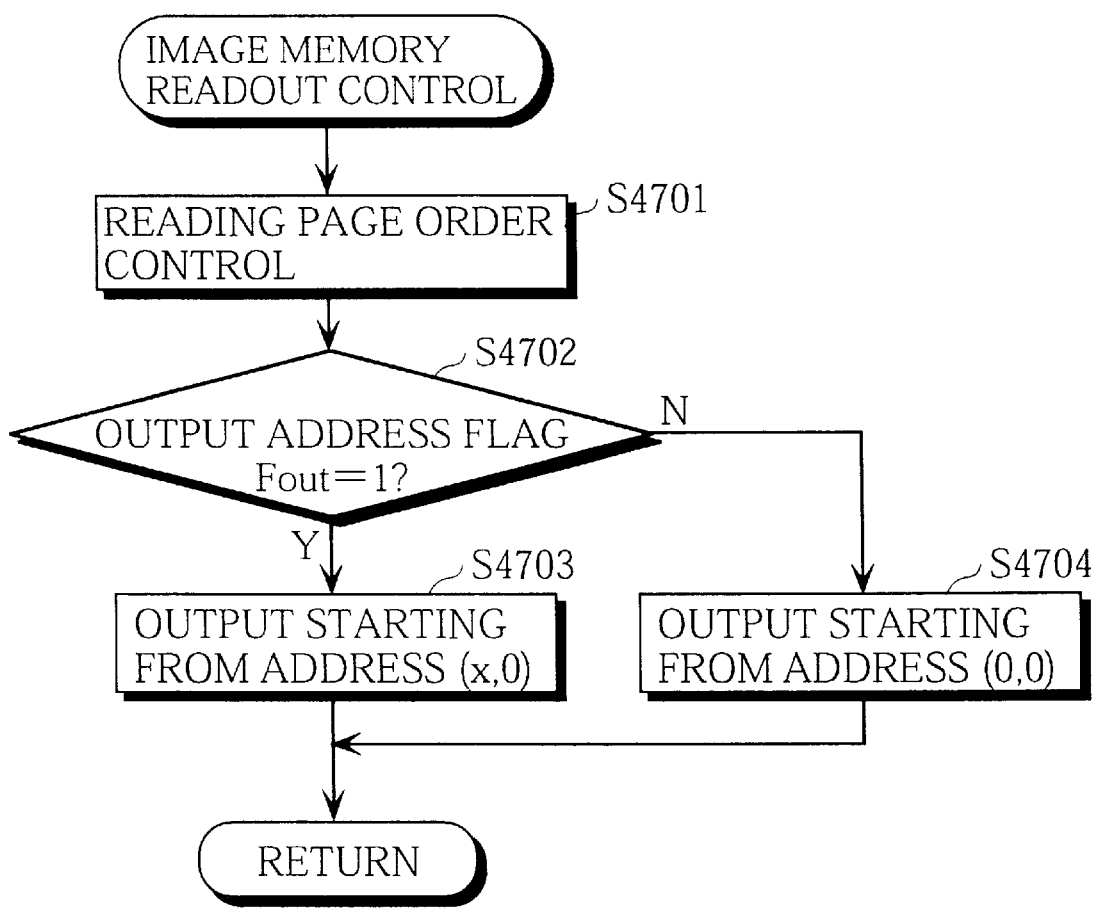
FIG. 24 is a flowchart showing the subroutine of the image memory readout control of FIG. 23.

FIG. 24 is a flowchart showing the subroutine of the control operation over readout from the image memory in step S470.

The CPU 406 receives an instruction as to the reading order (see FIGS. 22A and 22B) from the CPU 405, and then controls the reading order from the image memory 223 (step S4701). If the output address flag Fout is "1" at this point, the image data on the reverse side of each original document should be read in the sub-scan direction, and therefore, the output is controlled so that the output starts from the address (x, 0) (see FIG. 11) (steps S4702 and S4703). If the output address flag is "0", the output starts from the address (0, 0) (steps S4702 and S4704), and the subroutine then comes to an end.

(3-5) Print Control

As described above, in accordance with the read image data, the CPU 404 controls printing so as to form images on copying sheets (step S5 in FIG. 12).

FIG. 25 is a flowchart showing the print control process.

After initialization (step S501), the internal timer starts to control the timing so that the routine is performed in a predetermined period of time (steps S502 and S512). Upon receipt of a command to start printing from the CPU 405, the CPU 404 judges whether it is in the APS mode by inquiring of the CPU 405 (steps S503 and S504), and if it is in the APS mode, the CPU 404 inquires of the CPU 405 about the document size. If the document size has already been determined, a sheet cassette accommodating copying sheets of the same size as the determined document size is selected (steps S505 and S506). After start feeding copying sheets, the image data read from the image memory 223 through the memory control are sent to the printing unit 40, and the operation of the image forming unit 2 is then controlled so as to start printing (steps S507, S508, and S509).

After that, other processes related to printing, such as fixing, are performed (step S510), and when printing is completed, copying sheets are discharged (step S511). Then, the internal timer stops measuring time (step S512), and the routine comes to an end.

In the case where it is judged to be not in the APS mode in step S504, it is then judged if the AMS mode has been set in step S513. If it is in the AMS mode, copying sheets of a predetermined size are fed (step S514). The CPU 404 inquires of the CPU 405 about the document size, and if the document size has already been determined (step S515), the determined document size is compared with the fed copying sheets (step S516). If both sizes are the same, the image data read from the image memory are not subjected to magnification change, and printing is started (steps S508 and S509). If the determined document size is different from the copying sheet size, magnification suitable for transferring the image data onto the copying sheets is determined (step S517). This magnification can be readily selected from a table containing magnification data in relation to combinations of document size and copying sheet size. Such a table is stored in the ROM 414 (shown in FIG. 6), for instance.

After setting the magnification, the image data read from the image memory are subjected to magnification change so that images can be formed at the magnification determined above (steps S518 and S519), and printing is started in accordance with the image data (step S509).

In the case where it is judged that the AMS mode has not been set in step S513, the manual mode has been set instead, and copying sheets of a predetermined size are fed (step S520). If magnification is designated by the user, the image data read from the image memory are subjected to magnification change so that images can be formed at the designated magnification (steps S521, S522, S523, and S509). If magnification is not designated by the user, the image data read from the image memory are not subjected to magnification change, and then, printing is started (step S509). After steps S510 to S512 are performed, this routine comes to an end.

The magnification change process of steps S519 and S523 is conducted as follows. A bit-map conversion program is stored in the ROM 414, and image data are read out from the image memory 223 in accordance with the program. The image data are then subjected to bit-map conversion into a memory area of a specified magnification and thus written into the RAM 424.

In the above flowchart, the magnification change is not conducted in the APS mode, but it is possible to determine a copying sheet size suitable for printing based on predetermined magnification, feed copying sheets of the determined size, and then perform the magnification change on the read image data before printing images on the copying sheets.

(3-6) Time Relationship Between Document Size Determination and Print Control

The following is an explanation of the time relationship between the document size determination and the print control.

In the stationary document scan mode, a document size determination sensor (not shown) is provided below the platen glass 203, and the size of an original document placed on the platen glass 203 is determined by the document size determination sensor. Accordingly, the document size is first determined, so it is possible to simultaneously start reading the original documents and feeding copying sheets of the same size as the document size in the stationary document scan mode.

In the moving document scan mode, however, there is a problem that, since the transport path in the first transport unit DF1 is made short so that the automatic document feeder 300 can be compact as described above, the top end of an original document reaches the document reading position P3 and the document reading is started, even before the original document passes the document size determination sensor SE5, i.e., before the document size is determined (see FIG. 3A, for instance).

In such a case, it is no longer possible to start reading and feeding at the same time, and therefore, the document size determining operation is performed in parallel with the reading operation so that the sheet feeding and printing operation can be started after the document size is determined.

FIG. 26 shows the process in the moving document scan mode and in the APS mode, from the start of copying to the end of printing.

After copying starts with the press of a copy start key (T1), the scanner 204 is moved to the document reading position P3 (T2), and the automatic document feeder 300 starts transporting original documents (T3). When the top end of the first original document reaches the document size determination sensor SE5, the document size determination sensor SE5 starts determining the document size (T4). The original document is transported further to the document reading position P3, where image reading is started by the image reader unit 200 (T5). The image data read by the image reader unit 200 are processed by the image signal processing unit 202 and written into the memory unit 220 sequentially (T6). When the bottom end of the original document passes the document size determination sensor SE5, the document size is determined (T7), and a sheet cassette accommodating copying sheets of the same size as the original document is selected (T8). The copying sheets are fed (T9), the image data are read out of the memory unit 220 (T10), and printing is thus started. After the start of printing, the document image reading and memory writing are still continued. When the image reading is finished (T12), the printing is also completed (T13), and the printed copying sheets are discharged (T14).

FIG. 27 is a timing chart for clarifying the time relationship among the document reading, document size determination, sheet feeding, and printing.

Firstly, original documents placed on the document feed tray 301 start being fed by pressing the copy start key. When the top end of the first original document reaches the document size determination sensor SE5, the document size determination is commenced (B1). The original document is further sent to the document reading position P3, where the document reading is started (A1). In this embodiment, since the distance between the document feeding point and the reading point is made short so as to keep the automatic document feeder 300 compact, the document size determination by the document size determination sensor SE5 has not been completed yet at the point of A1. The document size determination is completed at the point of B2, where the document size is determined.

After the document size determination, a sheet cassette accommodating copying sheets of the designated size is selected, and the copying sheets starts being fed (C1). Before the top end of the first copying sheet reaches the transferring point of the image forming unit 2, printing (image formation) is started on the photosensitive drum 2*a* (D1). The document reading is still continued after the document size determination, and when the bottom end of the original document passes the document reading position P3, the document reading comes to an end (A2). The first sheet feeding from the selected sheet cassette is finished (C2), and the printing is then completed (D2).

Since there is no need to perform the document size determination for the second and later original documents, the document reading, sheet feeding, printing, and other processes are repeated in the same manner.

FIG. 28 shows the process in the stationary document scan mode and in the AMS mode, from the start of copying to the end of printing.

After copying starts with the press of the copy start key (T21), the scanner 204 moves to the document reading position P3 (T22), and the automatic document feeder 300 starts transporting original documents (T23). When the top end of the first original document reaches the document size determination sensor SE5, the document size determination sensor SE5 starts determining the document size (T24). The original document is transported further to the document reading position P3, where image reading is started by the image reader unit 200 (T25). The image data read by the image reader unit 200 are processed by the image signal processing unit 202 and written into the memory unit 220 sequentially (T26). When the bottom end of the original document passes the document size determination sensor SE5, the document size is determined (T27), and magnification suitable for forming images on copying sheets of the designated size is determined (T28). The copying sheets start being fed (T29), the image data are read out of the memory unit 220 (T30), and printing is thus started with the image data subjected to magnification change (T31 and T32). After the start of printing, the document image reading and memory writing are still continued. When the image reading is finished (T33), the printing is also completed (T34), and the printed copying sheets are discharged (T35).

In the AMS mode, magnification is determined at the time of determining the document size, and even if the image data of one page have not been read at this point, the image data, which have already been written, are read out and subjected to magnification change for desirable printing.

In such a case, the timing of the document reading, document size determination, sheet feeding, and printing is the same as shown in the timing chart of FIG. 27, except that, upon readout of image data, magnification is determined or changed when necessary. Copying sheets, however, do not necessarily start being fed right after the document size determination as in the APS mode. Still, the sheet feeding should be started in time with the start of the printing operation, and therefore, the timing of the sheet feeding is substantially the same as in FIG. 27.

Since the feeding operation and printing operation do not start until the document size determination is finished, it may appear that the overall copying process takes a long period of time. If the document reading is started after the document size determination, however, the transport path in the first transport unit DF1 need to be longer than the original document in the transport direction, and the time required for transporting the original document through the transport path should be added to the total printing processing time. As a result, the time required for the copying operation for one sheet remains substantially the same. With the above described structure, the transport path in the first transport unit DF1 can remain short no matter how large the document size is, and thus, the automatic document feeder 300 can be made more compact and lighter.

A digital copying machine having this structure does not take up too much space, and because of its lightness, it is easy to lift the automatic document feeder 300 up to place an original document on the platen glass 203.

Furthermore, printing can be started either in the APS mode or in the AMS mode even when the document reading has not been finished, and by this method, images can be formed faster than by the conventional method in which printing is started only after the document size is determined from the image data of the original document.

(4) The image reading apparatus of the present invention applied to a copying machine has been described so far by way of the embodiment, but it should be noted that the present invention is not limited to the above embodiment.

(4-1) In the above embodiment, the largest readable document size is A3T, and the transport path in the second transport unit DF2 has such a length as to hold two A4Y size documents at predetermined intervals. A4Y size documents are employed in the embodiment, because A4 size is simply the most frequently used in office work, and the copying machine of the embodiment is designed to make copies of A4 documents at high efficiency. So, the circular sheet transport path may be designed to accommodate documents of other sizes such as B4 and B5.

(4-2) In the memory control of the above embodiment, the sub-scan direction reading order reversing unit 226 is provided in the memory unit 220, so that the image data of the reverse-side of an original document are read out in a shuffled sub-scan direction memory reading order so as to form an image in the same direction as the original document. As explained with reference to FIG. 10, when the top and bottom of the printed characters on the original document conform to the main-scan direction (Y-axis), the top and bottom of the front side of the original document also conform to the main-scan direction. However, the right and left of the front side of the original document are reversed on the reverse side, and therefore, the sub-scan direction memory reading order needs to be changed.

On the other hand, in the case of where the top and bottom of the characters on the document conform to the sub-scan direction instead of the main-scan direction, the reproduction of the correct image depends on the main-scan direction reading. Thus, a main-scan direction reading order reversing unit should be provided in place of the sub-scan direction reading order reversing unit, so as to change the main-scan direction memory reading order in the reverse-side printing.

In the above embodiment, only the sub-scan direction reading order reversing unit 226 designed for dealing with A4 size documents most used in office work. To comply with various demands, however, a main-scan direction reading order reversing unit may be provided in addition to the sub-scan direction reading order reversing unit 226 in the memory unit 220, and the direction of the characters on the original document may be set from the operation panel 500 at the time of setting the two-sided document reading mode, and according to the instruction, the reading order in the reverse-side printing may be changed in the main-scan direction or the sub-scan direction.

(4-3) In the memory control of the above embodiment, the sub-scan direction reading order in the front-side printing is inverted for the reverse-side printing by the sub-scan direction reading order reversing unit 226, so as to form a faithful reproduction image. However, it may also possible to change the sub-scan reading order when the image data temporarily stored in the image memory 223 are converted into code data by the compressor 231 before the image data are written into the code memory 225.

In the case where the main-scan direction reading order needs to be changed, the main-scan direction data reading order of the CCD sensor 210 may be changed before the image data are written into the image memory 223.

(4-4) In the above embodiment, the document size determination sensors SE5 and SE6 are provided in the closest vicinity to the document feeding unit DF0 (i.e., past the separating rollers 304) in the transport unit of the first transport unit DF1, as shown in FIG. 2. It should be understood that the document size determination sensors are preferably arranged as closely to the document feeding unit DF0 as possible in the first transport unit DF1 so that the document size is determined in the earliest possible stage. The object of the present invention, however, is achievable somehow even if the document size determination sensors are not arranged in that particular position, as long as they are disposed in the transport path of the first transport unit DF1. (4-5) In the above embodiment, the image reading apparatus of the present invention is applied to a digital copying machine, but it is also applicable to any other image reading apparatus of a moving document scanning type provided with an automatic document feeder, such as a facsimile machine.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A copying machine for forming an image on a copying sheet according to image data of a moving document read by an image reader provided in a document reading position, comprising:

a document feeder for feeding documents placed on a document tray to said document reading position one by one;

a document detecting unit provided in a transport path in said document feeder for detecting a document passing through said transport path;

a document size determining unit for determining the size of a document being transported in accordance with detection signals transmitted from said document detecting unit;

a sheet feeder for feeding a copying sheet of a size selected in accordance with said determined document size;

a memory for storing image data of a document read by said image reader;

a printer for forming an image on a copying sheet fed from said sheet feeder in accordance with said image data; and a controller for controlling the operations of said image reader, said sheet feeder, and said printer so that image reading is started when the top end of a document reaches said document reading position even if said document size determining unit has not yet determined the size of said document, image data of said document are written into said memory, feeding of a copying sheet of a selected size is started even if said image reading has not been finished at the time of determining said document size, reading of said image data from said memory is started, and an image is finally formed on said selected size copying sheet.

2. A copying machine according to claim 1, wherein said document feeder is provided with a separating device for separating documents placed on said document tray from one another to feed them one by one, and said document detecting unit is disposed past said separating device in said transport path.

3. A copying machine according to claim 1, wherein said document detecting unit comprises a first detector disposed in such a position that a document having the smallest width can be detected and a second detector for determining the width of a document being transported, and said document size determining unit determines the length of a document in a transport direction from the feeding speed of said document feeder and the time elapsed between the detection of the top end of said document and the detection of the bottom end of said document, and then determines the size of said document from said determined document length and the width of said document determined by said second detector.

4. A copying machine for forming an image on a copying sheet according to image data of a moving document read by an image reader provided in a document reading position, comprising:

a document feeder for feeding documents placed on a document tray to said document reading position one by one;

a document detecting unit provided in a transport path in said document feeder for detecting a document passing through said transport path;

a document size determining unit for determining the size of a document being transported in accordance with detection signals transmitted from said document detecting unit;

a sheet feeder for feeding a copying sheet of a predetermined size;

a memory for storing image data of a document read by said image reader;

a magnification determining unit for determining magnification from said determined document size for forming an image of said document on said copying sheet of a predetermined size;

a magnification change unit for subjecting said image data to magnification change at said determined magnification;

a printer for forming an image on a copying sheet fed from said sheet feeder in accordance with said magnification-changed image data; and a controller for controlling the operations of said image reader, said sheet feeder, said magnification change unit, and said printer so that image reading is started when the top end of a document reaches said document reading position even if said document size determining unit has not yet determined the size of said document, image data of said document are written into said memory, reading of said image data from said memory is started even if said image reading has not been finished at the time of determining magnification from said determined document size, said image data are subjected to magnification change, and an image is finally formed on said fed copying sheet in accordance with said magnification-changed image data.

5. A copying machine according to claim 4, wherein said document feeder is provided with a separating device for separating documents placed on said document tray from one another to feed then one by one, and said document detecting unit is disposed past said separating device in said transport path.

6. A copying machine according to claim 4, wherein said document detecting unit comprises a first detector disposed in such a position that a document having the smallest width can be detected and a second detector for determining the width of a document being transported, and said document size determining unit determines the length of a document in a transport direction from the feeding speed of said document feeder and the time elapsed between the detection of the top end of said document and the detection of the bottom end of said document, and then determines the size of said document from said determined document length and the width of said document determined by said second detector.

7. A method of forming an image on a copying sheet in accordance with image data of a moving document read by an image reader provided in a document reading position, comprising the steps of:
(1) feeding documents placed on a document tray to said document reading position one by one;
(2) detecting a document passing through a transport path by a document detecting unit;
(3) before determining the size of said document, starting image reading of said document being transported, and storing its image data into a memory;
(4) according to detection signals transmitted from said document detecting unit, determining the size of said document being transported, and generating document size information;
(5) before finishing said image reading, receiving said document size information, selecting a sheet size from a predetermined set of sizes, and starting feeding a copying sheet of said selected size; and
(6) in accordance with said image data stored in said memory, forming an image on said fed copying sheet.

8. A method of forming an image on a copying sheet in accordance with image date of a moving document read by an image reader provided in a document reading position, comprising the steps of:
(1) feeding documents placed on a document tray to said document reading position one by one;
(2) detecting a document passing through a transport path by a document detecting unit;
(3) before determining the size of said document, starting image reading of said document being transported, and storing its image data into a memory;
(4) according to detection signals transmitted from said document detecting unit, determining the size of said document being transported, and according to said determined document size, determining magnification suitable for forming an image on a copying sheet to be fed;
(5) before finishing said image reading, starting feeding a copying sheet of a predetermined size;
(6) subjecting said stored image data to magnification change so as to form said image at said determined magnification; and
(7) in accordance with said magnification-changed image data, forming said image on said fed copying sheet.

9. An image reading apparatus for reading a document passing a document reading position, comprising:
a first transport unit for transporting documents one by one in a first transport direction from a document tray to said document reading position;
a second transport unit for turning over a document by guiding said document into a U-shaped transport path so as to send it back to said document reading position in a second transport direction, which is opposite to said first transport direction;
an image reader disposed in said document reading position for optically reading a document passing through and producing image data;
a memory for storing image data; and
a controller for controlling a reading order of image data from said memory.

10. An image reading apparatus according to claim 9, wherein
said controller controls said reading order so that reading order in the main-scan direction of image data of a document transported in said second transport direction is the reverse direction of reading order in said main-scan direction of image data of said document transported in said first transport direction, said main-scan direction being perpendicular to said document transport direction.

11. An image reading apparatus according to claim 9, wherein
said controller controls said reading order so that reading order in the sub-scan direction of image data of a document transported in said second transport direction is the reverse direction of reading order in said sub-scan direction of image data of said document transported in said first transport direction, said sub-scan direction being parallel with said document transport direction.

12. An image reading apparatus according to claim 9, wherein
the U-shaped transport path length of said second transport unit is longer than the longitudinal length of the largest readable document size in two-sided document reading mode.

13. An image reading apparatus according to claim 12 wherein
said U-shaped transport path length is longer than the length required to place two documents of half the largest readable document size transversely at a predetermined interval in two-sided copy mode.

14. An image reading apparatus according to claim 9, further comprising:
a third transport unit for transporting a document which has passed through the transport path of said second transport unit to a document discharging unit, a portion of the transport path of said third transport unit meeting with a portion of the transport path of said second transport unit; and
a transport direction switching unit for switching the document transport direction toward said document discharging unit after a document has passed said common transport portion in one-sided copy mode, and switching said document transport direction toward said document reading position after a document has passed said common transport portion in two-sided copy mode.

15. An image reading apparatus according to claim 14, wherein
document transport speed of said third transport unit is higher than document transport speed of said second transport unit.

16. An image reading apparatus according to claim 9, further comprising
a document holding roller for holding a document transported to said document reading position toward said image reader, rotating forward or backward depending on the direction in which a document is being transported.

17. An image reading apparatus according to claim 9, further comprising
a document glass plate for placing a document thereon wherein
said image reader is provided with a scanner for scanning said document by moving along said document glass plate.

18. A document reading method for producing image data by reading a document passing a document reading position, comprising the steps of:

(1) transporting documents one by one in a first transport direction from a document tray to said document reading position, and reading the image of a document by a photoelectric conversion element to produce first image data to be stored into a memory;

(2) turning over said document by guiding said document into a U-shaped transport path so as to send it back to said document reading position in a second transport direction, which is opposite to said first transport direction, producing second image data by reading the image of said document using said photoelectric conversion element, and storing said second image data into said memory;

(3) reading said first image data from said memory in first reading order; and (4) reading said second image data from said memory in second reading order, which is the reverse order of said first reading order, in the main-scan direction perpendicular to said document transport direction.

19. A document reading method for producing image data by reading a document passing a document reading position, comprising the steps of:

(1) transporting documents one by one in a first transport direction from a document tray to said document reading position, and reading the image of a document by a photoelectric conversion element to produce first image data a to be stored in a memory;

(2) turning over said document by guiding said document into a U-shaped transport path so as to send it back to said document reading position in a second transport direction, which is opposite to said first transport direction, producing second image data by reading the image of said document using said photoelectric conversion element, and storing said second image data into said memory;

(3) reading said first image data from said memory in first reading order; and (4) reading said second image data from said memory in second reading order, which is the reverse order of said first reading order, in the sub-scan direction parallel with said document transport direction.

20. A copying machine comprising:

a first transport unit for transporting documents one by one in a first transport direction from a document tray to a document reading position;

a second transport unit for turning over a document by guiding said document into a U-shaped transport path so as to send it back to the document reading position in a second transport direction, which is opposite to said first transport direction;

an image reader disposed in said document reading position for optically reading a document passing through and producing image data;

a memory for storing image data read by said image reader;

a controller for controlling reading order of image data from said memory; and a printer for forming an image on a sheet in accordance with said image data reading from said memory.

21. An image reading apparatus according to claim 9, wherein said controller controls said reading order by reversing a direction of said reading order when said document is transported in said second transport direction.

22. A copying machine according to claim 20, wherein said controller controls said reading order by reversing a direction of said reading order when said document is transported in said second transport direction.

* * * * *